(12) United States Patent
Pandya

(10) Patent No.: US 8,055,601 B2
(45) Date of Patent: *Nov. 8, 2011

(54) COMPILER FOR COMPILING CONTENT SEARCH RULES COMPRISING A REGULAR EXPRESSION USING A PROGRAMMABLE INTELLIGENT SEARCH MEMORY (PRISM) AND VECTORS

(76) Inventor: Ashish A. Pandya, El Dorado Hills, CA (US)

( * ) Notice: Subject to any disclaimer, the term of this patent is extended or adjusted under 35 U.S.C. 154(b) by 658 days.

This patent is subject to a terminal disclaimer.

(21) Appl. No.: 11/952,111

(22) Filed: Dec. 6, 2007

(65) Prior Publication Data

US 2008/0140600 A1 Jun. 12, 2008

Related U.S. Application Data

(60) Provisional application No. 60/965,267, filed on Aug. 17, 2007, provisional application No. 60/965,170, filed on Aug. 17, 2007, provisional application No. 60/963,059, filed on Aug. 1, 2007, provisional application No. 60/961,596, filed on Jul. 23, 2007, provisional application No. 60/933,313, filed on Jun. 6, 2007, provisional application No. 60/933,332, filed on Jun. 6, 2007, provisional application No. 60/930,607, filed on May 17, 2007, provisional application No. 60/928,883, filed on May 10, 2007, provisional application No. 60/873,632, filed on Dec. 8, 2006, provisional application No. 60/873,889, filed on Dec. 8, 2006.

(51) Int. Cl.
*G06F 17/00* (2006.01)

(52) U.S. Cl. ........................................ 706/47

(58) Field of Classification Search .............. 706/45–47, 706/62; 711/100, 103, 108; 707/706, 758, 707/736, 769
See application file for complete search history.

(56) References Cited

U.S. PATENT DOCUMENTS

| | | |
|---|---|---|
| 6,778,557 B1 | 8/2004 | Yuki et al. |
| 6,892,237 B1 | 5/2005 | Gai et al. |
| 7,353,332 B2 | 4/2008 | Miller et al. |
| 7,406,470 B2 | 7/2008 | Mathur et al. |
| 7,464,254 B2 | 12/2008 | Sharangpani et al. |
| 7,472,285 B2 | 12/2008 | Graunke et al. |
| 7,644,080 B2 | 1/2010 | Mammen et al. |
| 7,660,140 B1 | 2/2010 | Joshi et al. |
| 7,685,254 B2 | 3/2010 | Pandya |
| 7,827,190 B2 | 11/2010 | Pandya |
| 7,831,606 B2 | 11/2010 | Pandya |
| 7,831,607 B2 | 11/2010 | Pandya |
| 7,890,692 B2 | 2/2011 | Pandya |

(Continued)

OTHER PUBLICATIONS

Ville Laurikari, "NFAs with Tagged Transitions, Their Conversion to Deterministic Automata and Application to Regular Expressions", Seventh International Symposium on String Processing Infomratino Retrieval (SPIRE'00), Sep. 27-29, 2000.

(Continued)

*Primary Examiner* — David R Vincent
(74) *Attorney, Agent, or Firm* — DLA Piper LLP US

(57) ABSTRACT

Memory architecture provides capabilities for high performance content search. Content search rules comprise of regular expressions which are compiled to finite state automata and then programmed in Programmable Intelligent Search Memory (PRISM) for evaluating content with the search rules. A compiler compiles the content search rules for evaluation by PRISM memory. The PRISM memory architecture creates an innovative memory that can be programmed with content search rules which are used by the memory to evaluate presented content for matching with the programmed rules. When the content being searched matches any of the rules programmed in the Programmable Intelligent Search Memory (PRISM) action(s) associated with the matched rule(s) are taken.

10 Claims, 13 Drawing Sheets

U.S. PATENT DOCUMENTS

| | | |
|---|---|---|
| 7,899,976 B2 | 3/2011 | Pandya |
| 7,899,977 B2 | 3/2011 | Pandya |
| 7,899,978 B2 | 3/2011 | Pandya |
| 7,912,808 B2 | 3/2011 | Pandya |
| 2002/0161664 A1 | 10/2002 | Shaya et al. |
| 2004/0059443 A1 | 3/2004 | Sharangpani |
| 2004/0083387 A1 | 4/2004 | Dapp et al. |
| 2004/0215593 A1 | 10/2004 | Sharangpani et al. |
| 2005/0012521 A1 | 1/2005 | Sharangpani et al. |
| 2005/0052934 A1 | 3/2005 | Tran et al. |
| 2005/0108518 A1 | 5/2005 | Pandya |
| 2005/0216770 A1 | 9/2005 | Rowett et al. |
| 2006/0085533 A1 | 4/2006 | Hussain et al. |
| 2006/0136570 A1 | 6/2006 | Pandya |
| 2006/0253816 A1 | 11/2006 | Gould et al. |
| 2007/0038798 A1 | 2/2007 | Bouchard et al. |
| 2007/0061884 A1 | 3/2007 | Dapp et al. |
| 2007/0255894 A1 | 11/2007 | Hessel et al. |
| 2008/0008202 A1 | 1/2008 | Terrell et al. |
| 2008/0046423 A1 | 2/2008 | Khan Alicherry et al. |
| 2008/0071780 A1 | 3/2008 | Ichiriu et al. |
| 2008/0133517 A1 | 6/2008 | Kapoor et al. |
| 2008/0140600 A1 | 6/2008 | Pandya |
| 2008/0140661 A1 | 6/2008 | Pandya |
| 2008/0140911 A1 | 6/2008 | Pandya |
| 2008/0140912 A1 | 6/2008 | Pandya |
| 2008/0140991 A1 | 6/2008 | Pandya |
| 2008/0255839 A1 | 10/2008 | Larri et al. |
| 2009/0100055 A1 | 4/2009 | Wang |
| 2010/0198850 A1 | 8/2010 | Cytron et al. |

OTHER PUBLICATIONS

Gerard Berry et al., "From Regular Expressions to Deterministic Automata", Theoretical Computer Science, vol. 48, pp. 117-126 (1986).

Bruce W. Watson, "A Taxonomy of Finite Automata Contruction Algorithms", Computing Science, May 18, 1994.

Sailesh Kumar et al., "Algorithms to Accelerate Multiple Regular Expression Matching for Deep Packet Inspection", SIGCOMM'06, Sep. 11-15, 2006, Pisa, Italy, pp. 339-350.

Reetinder Sidhu et al., "Fast Regular Expression Matching Using FPGAs", Proceedings of the 9th Annual IEEE Symposium of Field-Programmable Custom Computing Machines, pp. 227-238 (2001).

Alfred V. Aho et al., "Efficient String Matching: An Aid to Bibliographic Search", Communication of the ACM, vol. 18, No. 6, pp. 333-340, Jun. 1975.

James Moscola et al., "Implementation of a Content-Scanning Module for an Internet Firewall", Proceedings of the 11th Annual IEEE Symposium on Field-Programmable Custom Computing Machines, pp. 31, 2003 (9 pages).

Sarang Dhamapurikar et al., "Deep Packet Inspection Using Parallell Bloom Filters", Hot Interconnects 11, IEEE Computer Society, pp. 52-61, Jan. 2004.

Ken Thompson, "Regular Expression Search Algorithm", Communication of the ACM, vol. 11, No. 6, pp. 419-422, Jun. 1968.

S.C. Kleene, "Representation of Events in Nerve Nets and Finite Automata", In Automata Studies, C.E. Shannon and J. McCarthy (eds.), Princeton, University Press, 1956, pp. 3-40.

M. O. Rabin et al., "Finite Automata and Their Decision Problems", IBM Journal, pp. 114-125, Apr. 1959.

John E. Hopcroft et al., "Introduction to Automata Theory, Language, and Computation", Addison-Wesley Publishing Company, 1979.

Alfred V. Aho et al., "Compilers: Principles, Techniques, and Tools", Pearson Education Inc., 2007.

File History of U.S. Appl. No. 11/952,028.
File History of U.S. Appl. No. 11/952,043.
File History of U.S. Appl. No. 11/952,103.
File History of U.S. Appl. No. 11/952,104.
File History of U.S. Appl. No. 11/952,108.
File History of U.S. Appl. No. 11/952,110.
File History of U.S. Appl. No. 11/952,112.
File History of U.S. Appl. No. 11/952,114.
File History of U.S. Appl. No. 11/952,117.

PCT International Search Report and Written Opinion of the International Searching Authority mailed on Apr. 30, 2008 regarding PCT/US2007/86785 filed on Dec. 7, 2007, (13 pgs.).

Office Action issued in U.S. Appl. No. 11/952,028, mailed Sep. 22, 2010.

Notice of Allowance issued in U.S. Appl. No. 11/952,110, mailed Oct. 14, 2010.

Notice of Allowance issued in U.S. Appl. No, 11/952,108, mailed Sep. 24, 2010.

Notice of Allowance issued in U.S. Appl. No. 11/952,117, mailed Oct. 28, 2010.

Notice of Allowance issued in U.S. Appl. No. 11/952,114, mailed Oct. 22, 2010.

Notice of Allowance issued in U.S. Appl. No. 11/952,043, mailed Nov. 22, 2010.

File History of U.S. Appl. No. 12/899,336.
File History of U.S. Appl. No. 12/902,485.
File History of U.S. Appl. No. 121902,500.
File History of U.S. Appl. No. 11/952,028.
File History of U.S. Appl. No. 12/899,336.
File History of U.S. Appl. No. 12/902,485.
File History of U.S. Appl. No. 12/902,500.
File History of U.S. Appl. No. 12/976,881.
File History of U.S. Appl. No. 13/006,265.
File History of U.S. Appl. No. 13/011,681.
File History of U.S. Appl. No. 13/011,692.
File History of U.S. Appl. No. 13/029,782.

Regular Expression: (xy + y)*yx
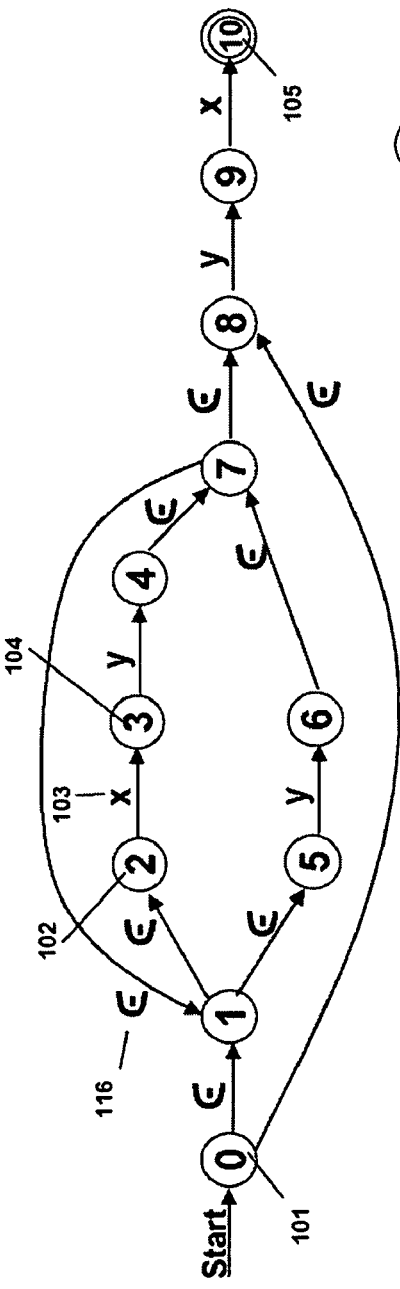
Fig. 1a Thompson's NFA (Prior Art)
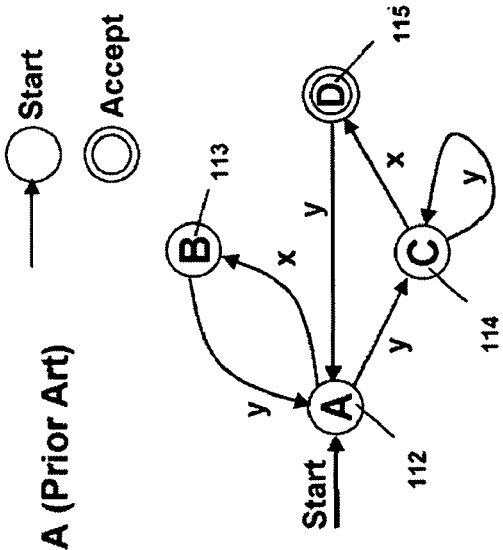
Fig. 1c DFA (Prior Art)
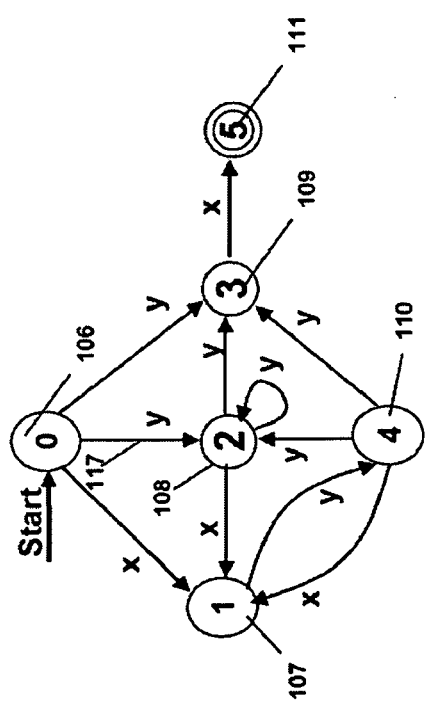
Fig. 1b Berry-Sethi NFA (Prior Art)

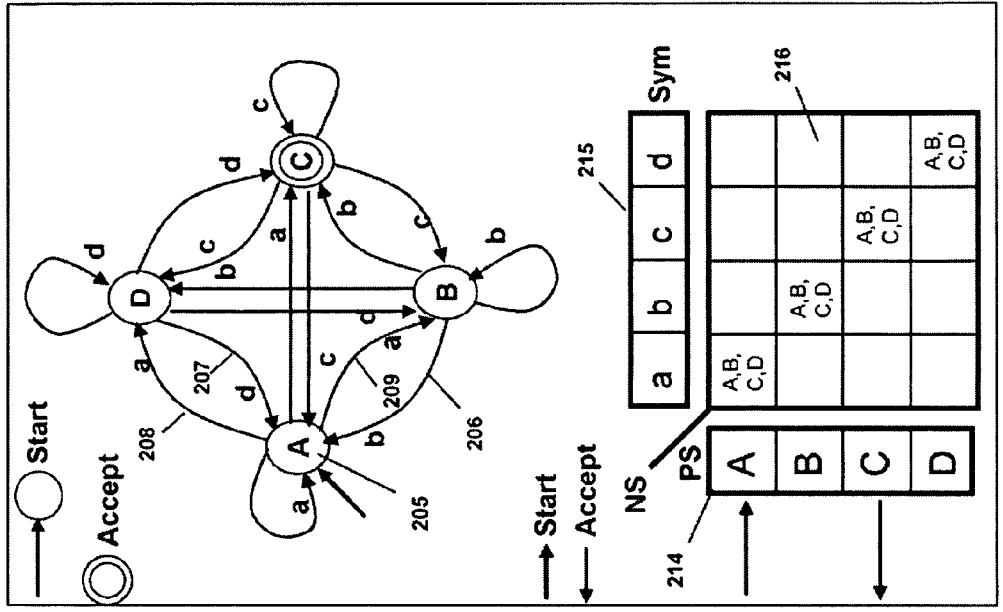
Fig. 2b A Right-biased NFA & State Transition Table (Prior Art)
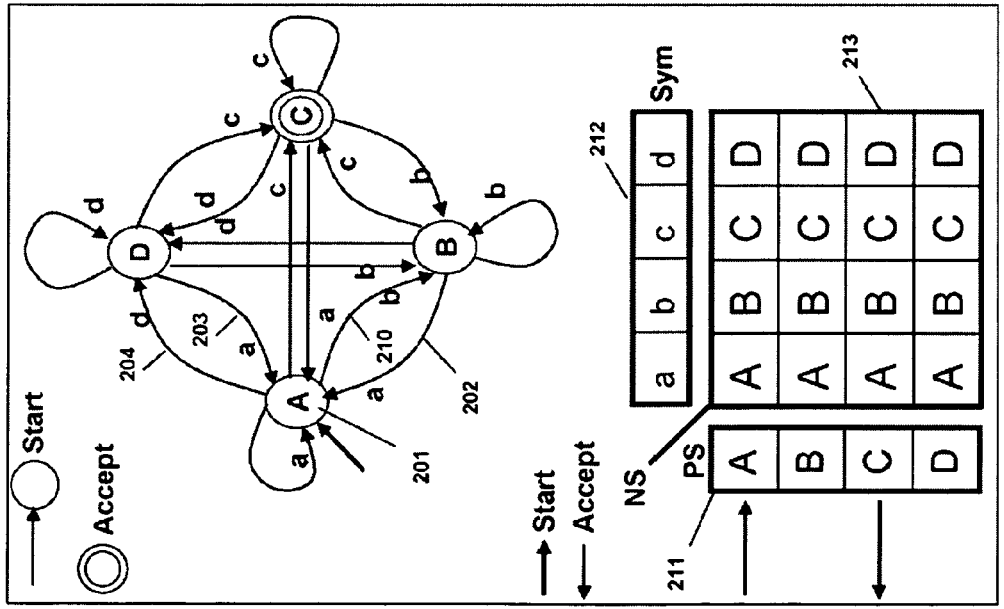
Fig. 2a A Left-biased NFA & State Transition Table (Prior Art)

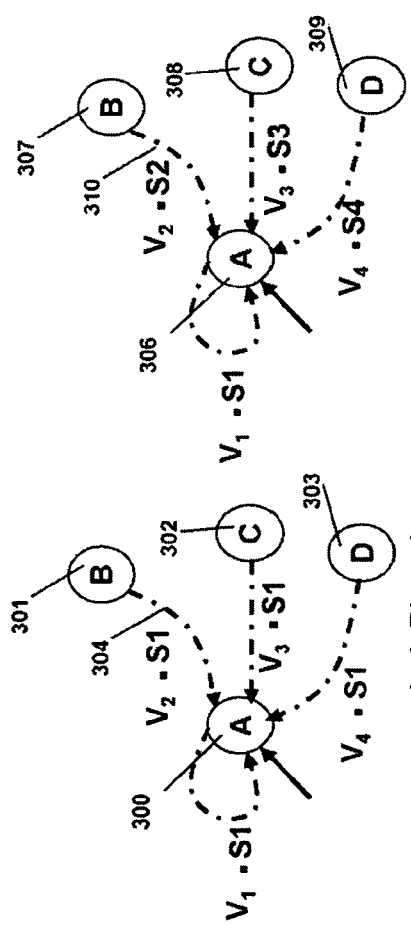

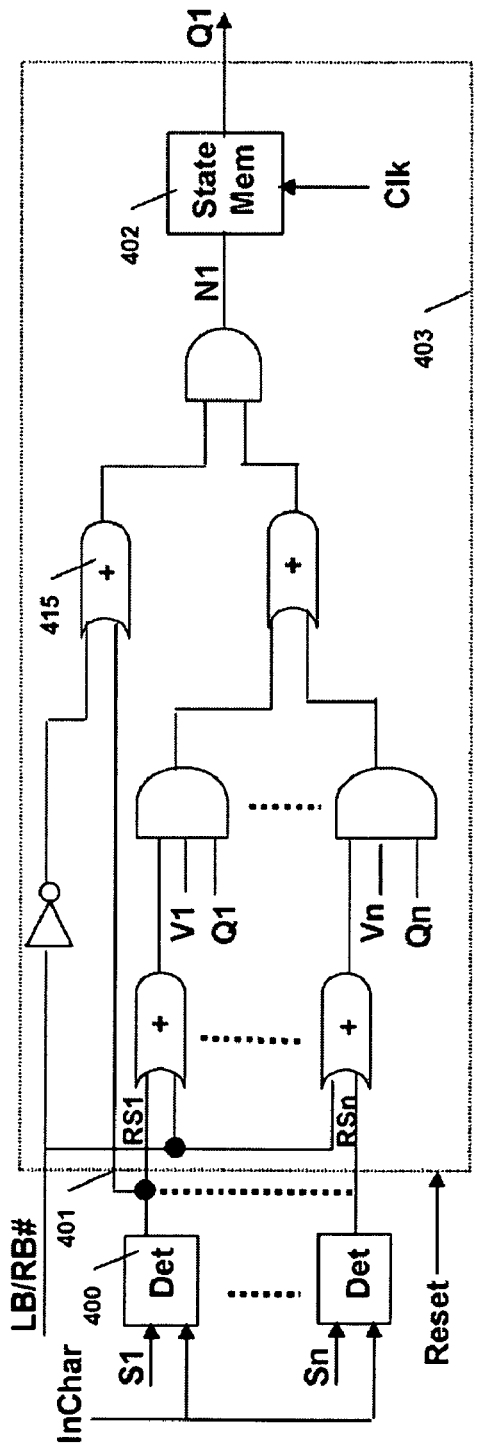
Fig. 4a State transition logic (STL) for a state
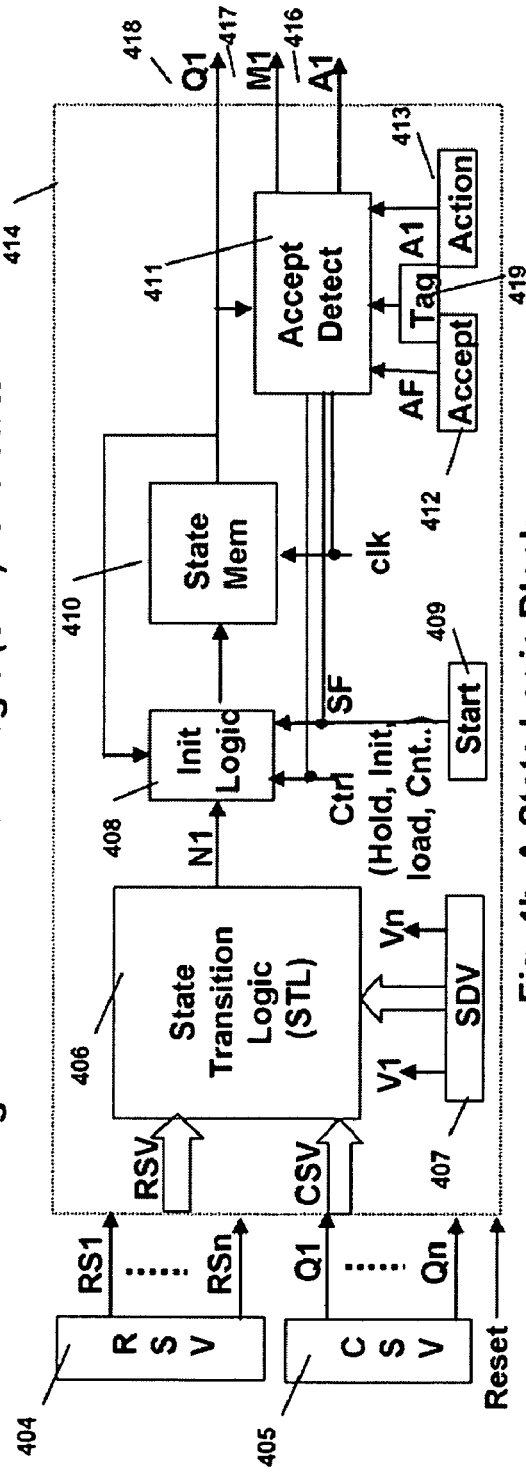
Fig. 4b A State Logic Block

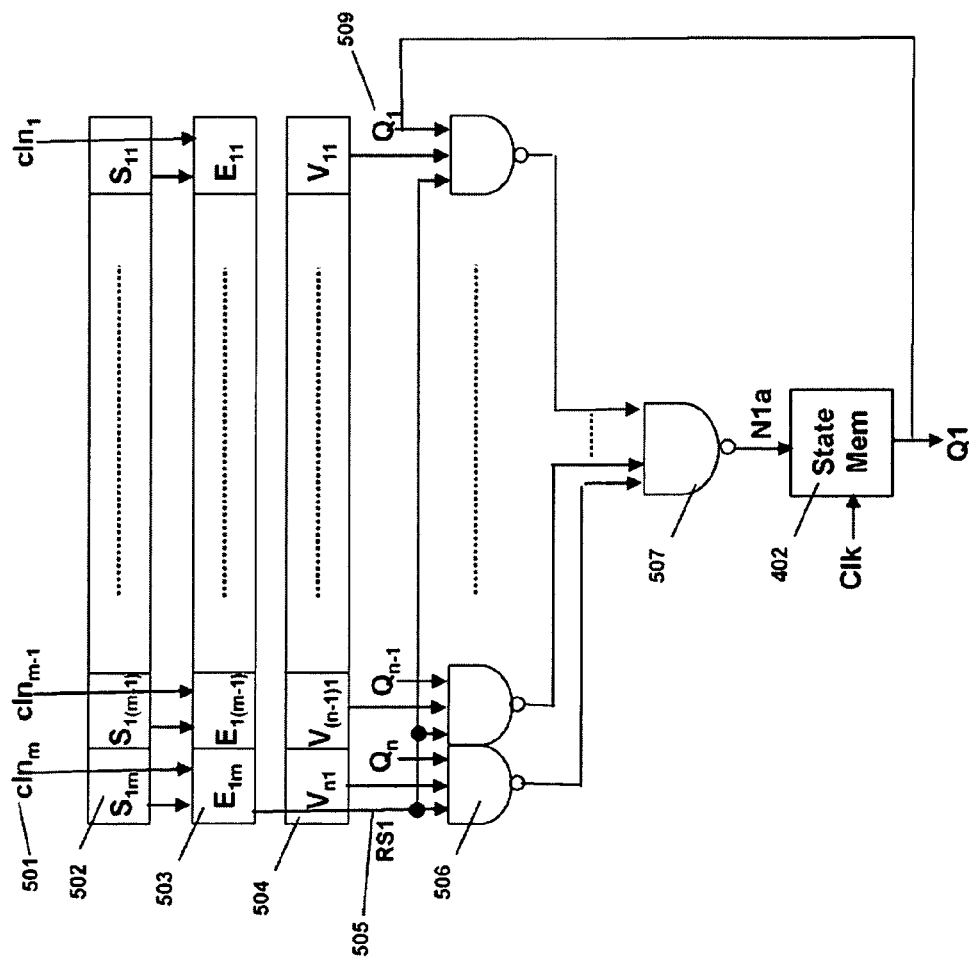
Fig. 5a State transition logic (STL) for a state in Left-biased FSA

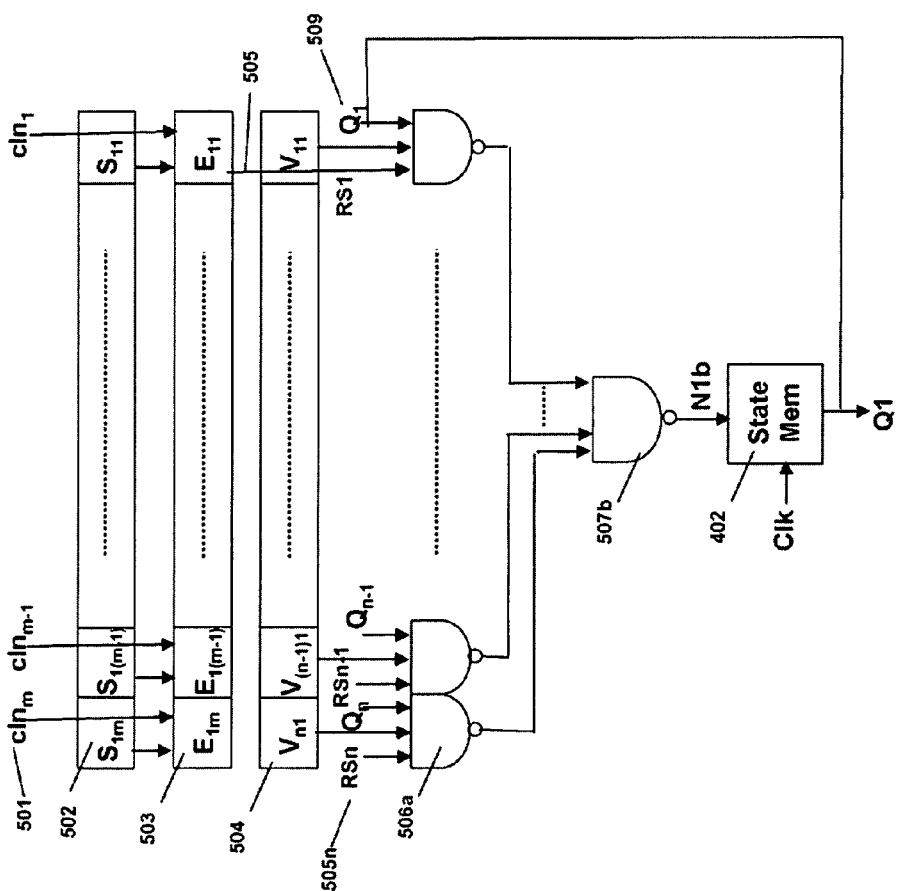
Fig. 5b State transition logic (STL) for a state in Right-biased FSA

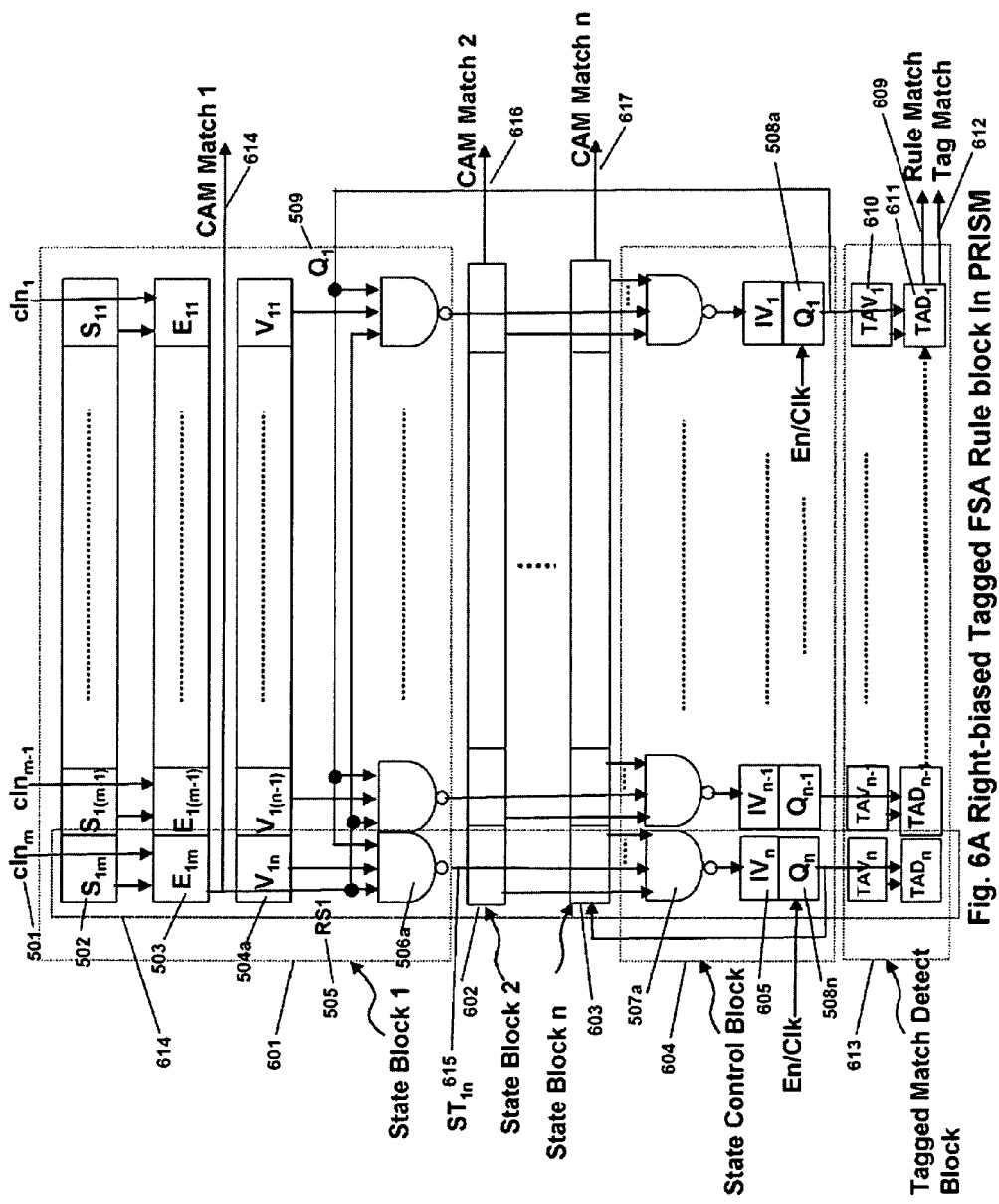

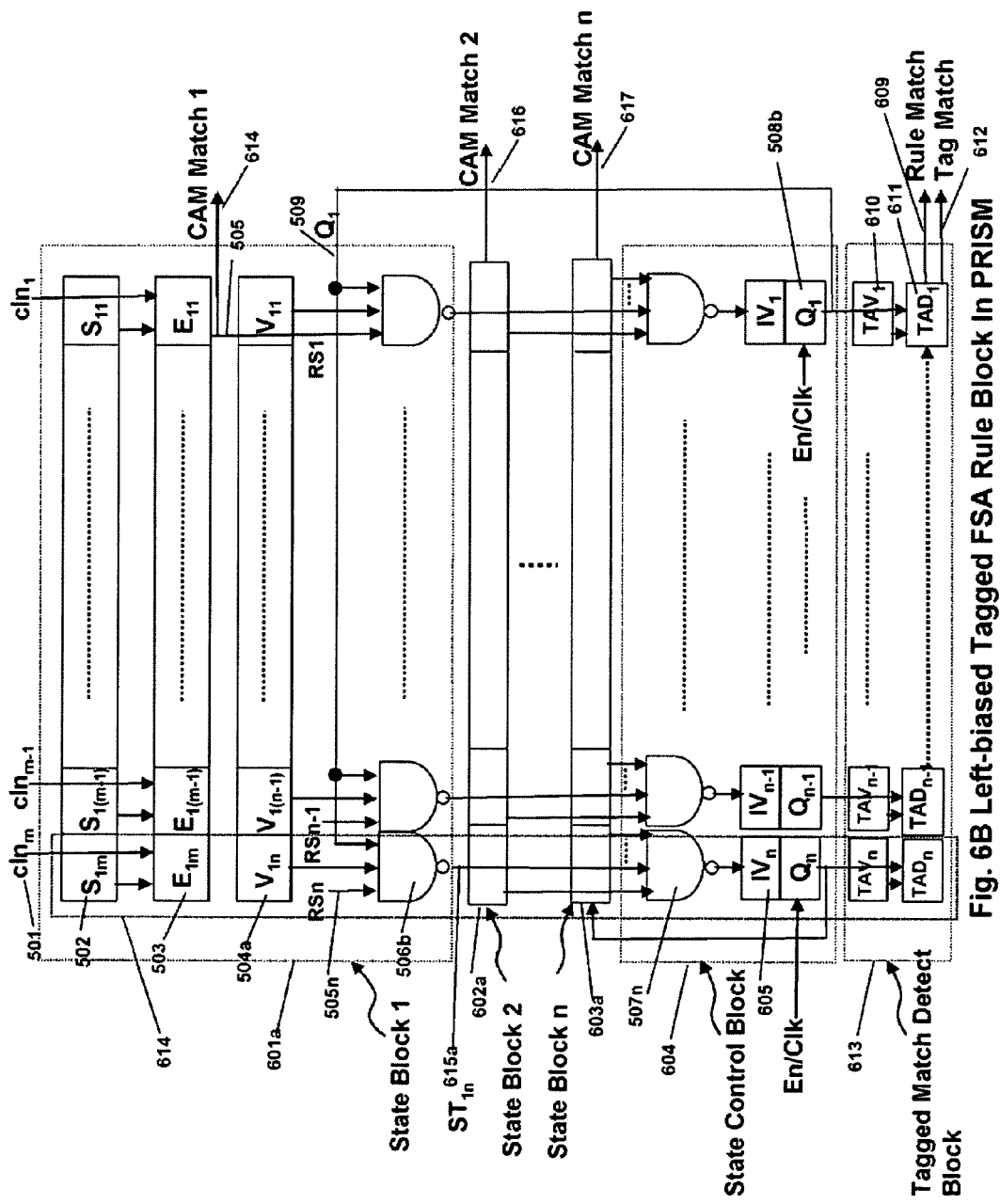
Fig. 6B Left-biased Tagged FSA Rule Block in PRISM

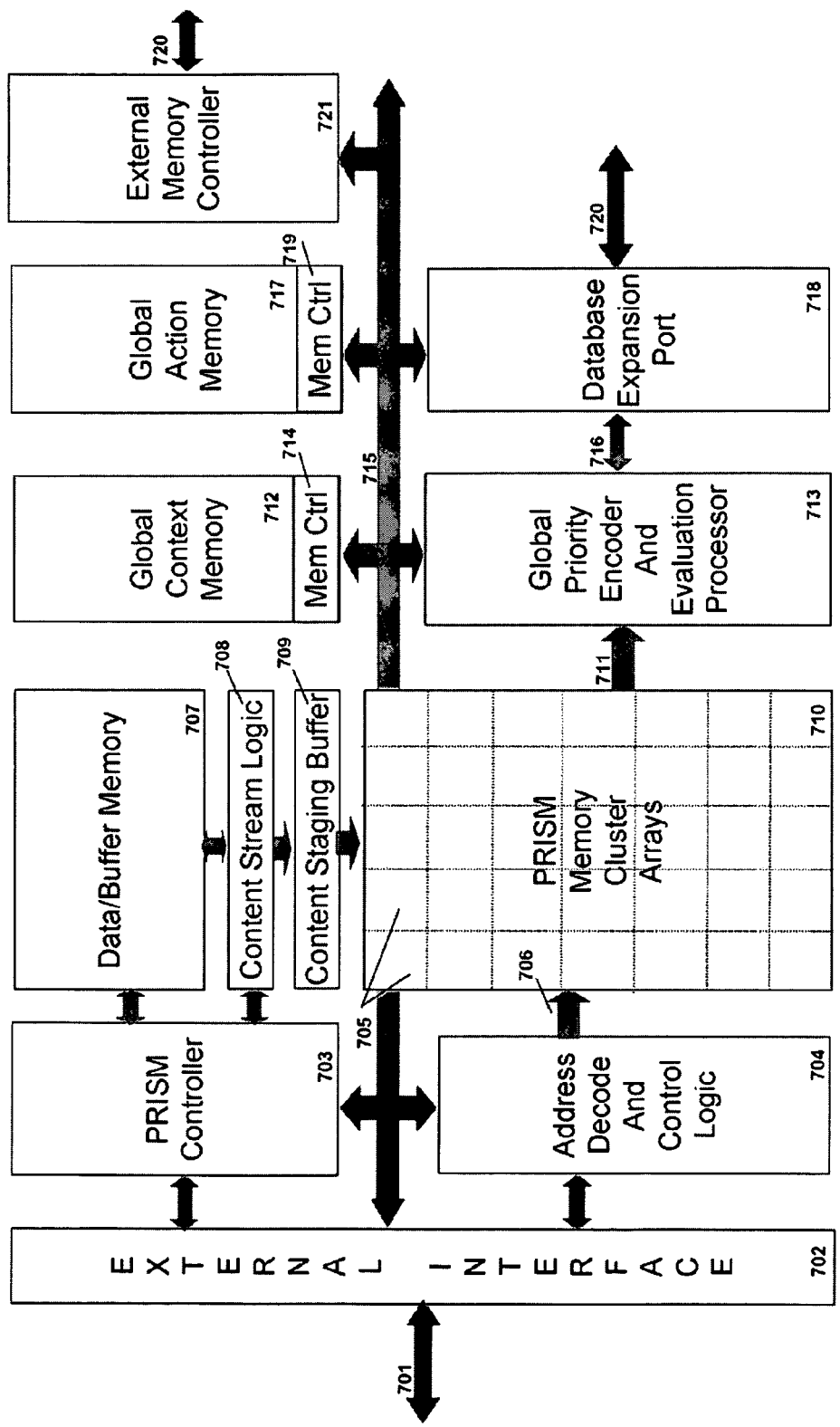
Fig. 7 PRISM Block Diagram

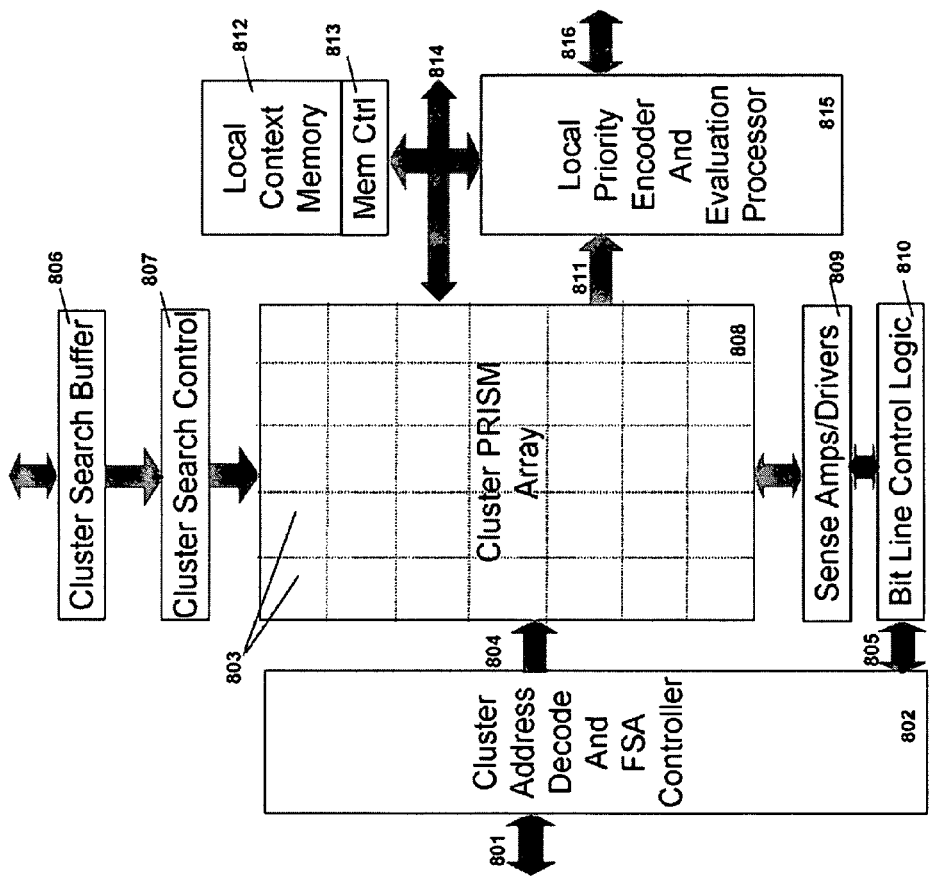
Fig. 8a PRISM Memory Cluster Block Diagram

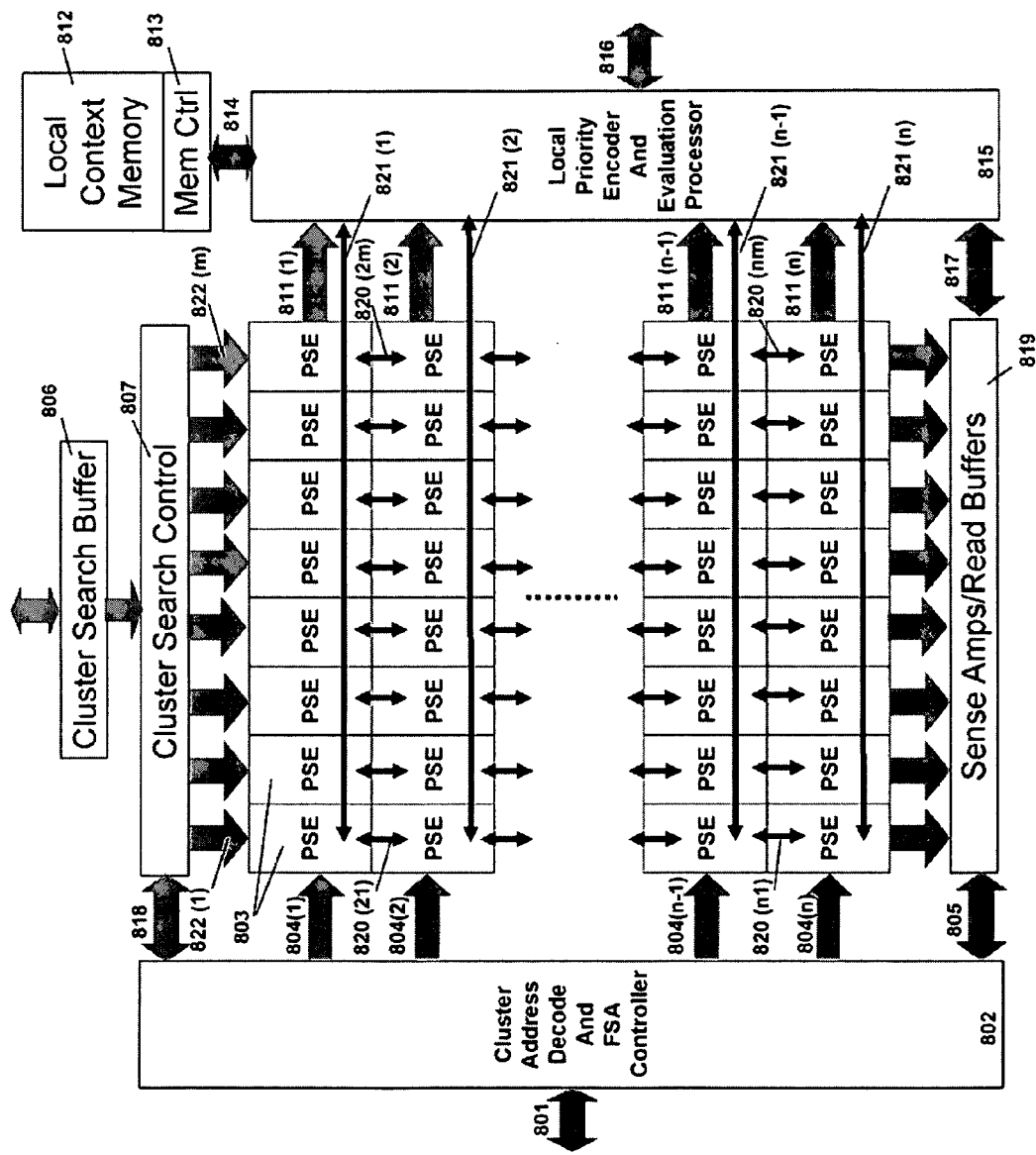
Fig. 8b PRISM Memory Cluster Detailed Block Diagram

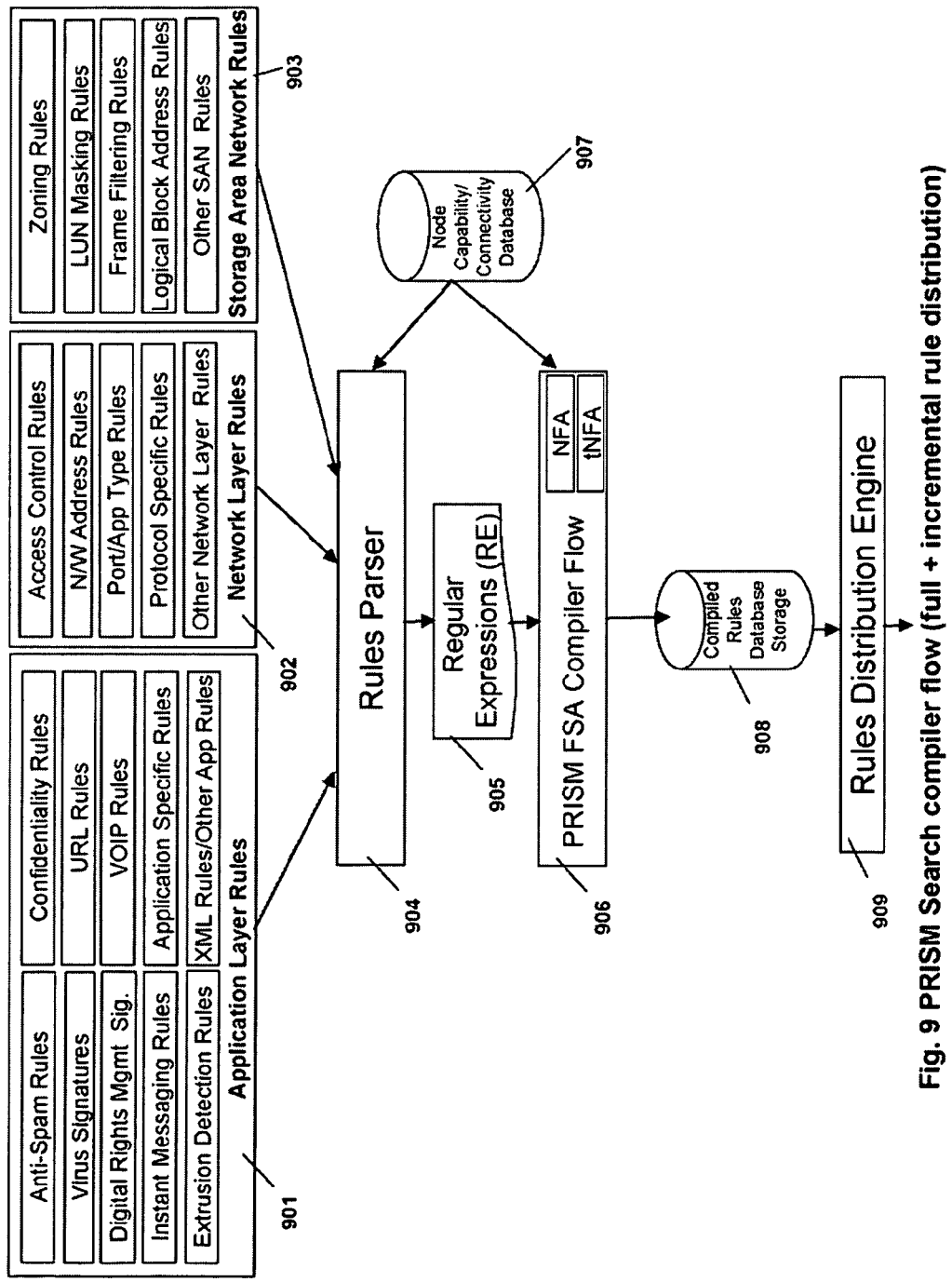
Fig. 9 PRISM Search compiler flow (full + incremental rule distribution)

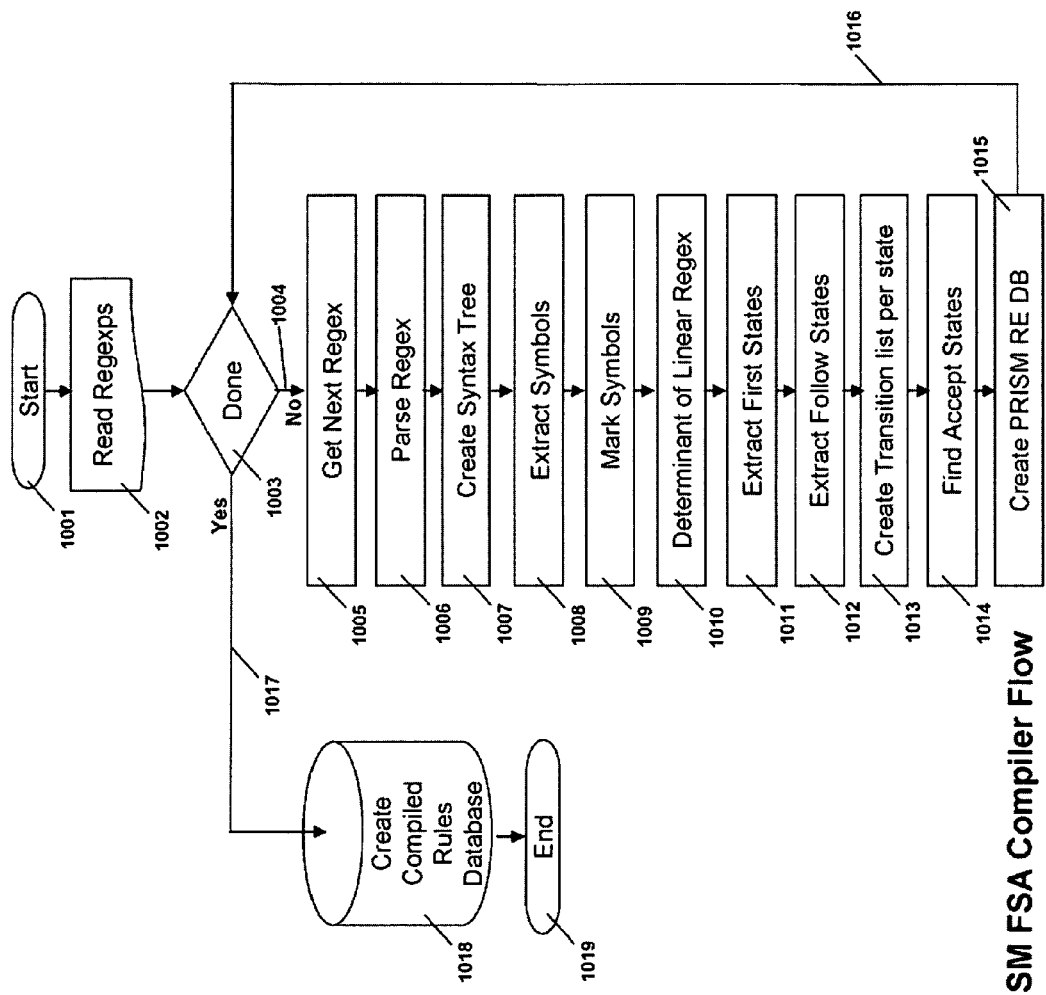
Fig. 10 PRISM FSA Compiler Flow

COMPILER FOR COMPILING CONTENT SEARCH RULES COMPRISING A REGULAR EXPRESSION USING A PROGRAMMABLE INTELLIGENT SEARCH MEMORY (PRISM) AND VECTORS

RELATED APPLICATIONS

Priority is claimed to Provisional Application Ser. No. 60/965,267 filed on Aug. 17, 2007 entitled Embedded programmable intelligent search memory, Provisional Application Ser. No. 60/965,170 filed on Aug. 17, 2007 entitled 100 Gbps security and search architecture using programmable intelligent search memory, Provisional Application Ser. No. 60/963,059 filed on Aug. 1, 2007 entitled Signature search architecture for programmable intelligent search memory, Provisional Application Ser. No. 60/961,596 filed on Jul. 23, 2007 entitled Interval symbol architecture for programmable intelligent search memory, Provisional Application Ser. No. 60/933,313 filed on Jun. 6, 2007 entitled FSA context switch architecture for programmable intelligent search memory, Provisional Application Ser. No. 60/933,332 filed on Jun. 6, 2007 entitled FSA extension architecture for programmable intelligent search memory, Provisional Application Ser. No. 60/930,607 filed on May 17, 2007 entitled Compiler for programmable intelligent search memory, Provisional Application Ser. No. 60/928,883 filed on May 10, 2007 entitled Complex symbol evaluation for programmable intelligent search memory, Provisional Application Ser. No. 60/873,632 filed on Dec. 8, 2006 entitled Programmable intelligent search memory, Provisional Application Ser. No. 60/873,889 filed on Dec. 8, 2006 entitled Dynamic programmable intelligent search memory, which are all incorporated herein by reference in their entirety as if fully set forth herein.

Priority is also claimed to U.S. patent application number not yet assigned filed on Dec. 6, 2007 entitled Embedded programmable intelligent search memory, U.S. patent application number not yet assigned filed on Dec. 6, 2007 entitled 100 Gbps security and search architecture using programmable intelligent search memory, U.S. patent application number not yet assigned filed on Dec. 6, 2007 entitled Signature search architecture for programmable intelligent search memory, U.S. patent application number not yet assigned filed on Dec. 6, 2007 entitled Interval symbol architecture for programmable intelligent search memory, U.S. patent application number not yet assigned filed on Dec. 6, 2007 entitled FSA context switch architecture for programmable intelligent search memory, U.S. patent application number not yet assigned filed on Dec. 6, 2007 entitled FSA extension architecture for programmable intelligent search memory, U.S. patent application number not yet assigned filed on Dec. 6, 2007 entitled Complex symbol evaluation for programmable intelligent search memory, U.S. patent application number not yet assigned filed on Dec. 6, 2007 entitled Programmable intelligent search memory, U.S. patent application number not yet assigned filed on Dec. 10, 2007 entitled Dynamic programmable intelligent search memory which are all co-pending U.S. patent applications of common ownership.

BACKGROUND OF THE INVENTION

This invention relates generally to memory technology and in particular to a regular expression compiler for a new high performance intelligent content search memory.

Many modern applications depend on fast information search and retrieval. With the advent of the world-wide-web and the phenomenal growth in its usage, content search has become a critical capability. A large number of servers get deployed in web search applications due to the performance limitations of the state of the art microprocessors for regular expression driven search.

There have been significant research and development resources devoted to the topic of searching of lexical information or patterns in strings. Regular expressions have been used extensively since the mid 1950s to describe the patterns in strings for content search, lexical analysis, information retrieval systems and the like. Regular expressions were first studied by S. C. Kleene in mid-1950s to describe the events of nervous activity. It is well understood in the industry that regular expression (RE) can also be represented using finite state automata (FSA). Non-deterministic FSA (NFA) and deterministic FSA (DFA) are two types of FSAs that have been used extensively over the history of computing. Rabin and Scott were the first to show the equivalence of DFA and NFA as far as their ability to recognize languages in 1959. In general a significant body of research exists on regular expressions. Theory of regular expressions can be found in "Introduction to Automata Theory, Languages and Computation" by Hopcroft and Ullman and a significant discussion of the topics can also be found in book "Compilers: Principles, Techniques and Tools" by Aho, Sethi and Ullman.

Computers are increasingly networked within enterprises and around the world. These networked computers are changing the paradigm of information management and security. Vast amount of information, including highly confidential, personal and sensitive information is now being generated, accessed and stored over the network. This information needs to be protected from unauthorized access. Further, there is a continuous onslaught of spam, viruses, and other inappropriate content on the users through email, web access, instant messaging, web download and other means, resulting in significant loss of productivity and resources.

Enterprise and service provider networks are rapidly evolving from 10/100 Mbps line rates to 1 Gbps, 10 Gbps and higher line rates. Traditional model of perimeter security to protect information systems pose many issues due to the blurring boundary of an organizaton's perimeter. Today as employees, contractors, remote users, partners and customers require access to enterprise networks from outside, a perimeter security model is inadequate. This usage model poses serious security vulnerabilities to critical information and computing resources for these organizations. Thus the traditional model of perimeter security has to be bolstered with security at the core of the network. Further, the convergence of new sources of threats and high line rate networks is making software based perimeter security to stop the external and internal attacks inadequate. There is a clear need for enabling security processing in hardware inside core or end systems beside a perimeter security as one of the prominent means of security to thwart ever increasing security breaches and attacks.

FBI and other leading research institutions have reported in recent years that over 70% of intrusions in organizations have been internal. Hence a perimeter defense relying on protecting an organization from external attacks is not sufficient as discussed above. Organizations are also required to screen outbound traffic to prevent accidental or malicious disclosure of proprietary and confidential information as well as to prevent its network resources from being used to proliferate spam, viruses, worms and other malware. There is a clear need to inspect the data payloads of the network traffic to protect and secure an organization's network for inbound and outbound security.

Data transported using TCP/IP or other protocols is processed at the source, the destination or intermediate systems in the network or a combination thereof to provide data security or other services like secure sockets layer (SSL) for socket layer security, Transport layer security, encryption/decryption, RDMA, RDMA security, application layer security, virtualization or higher application layer processing, which may further involve application level protocol processing (for example, protocol processing for HTTP, HTTPS, XML, SGML, Secure XML, other XML derivatives, Telnet, FTP, IP Storage, NFS, CIFS, DAFS, and the like). Many of these processing tasks put a significant burden on the host processor that can have a direct impact on the performance of applications and the hardware system. Hence, some of these tasks need to be accelerated using dedicated hardware for example SSL, or TLS acceleration. As the usage of XML increases for web applications, it is creating a significant performance burden on the host processor and can also benefit significantly from hardware acceleration. Detection of spam, viruses and other inappropriate content require deep packet inspection and analysis. Such tasks can put huge processing burden on the host processor and can substantially lower network line rate. Hence, deep packet content search and analysis hardware is also required.

Internet has become an essential tool for doing business at small to large organizations. HTML based static web is being transformed into a dynamic environment over last several years with deployment of XML based services. XML is becoming the lingua-franca of the web and its usage is expected to increase substantially. XML is a descriptive language that offers many advantages by making the documents self-describing for automated processing but is also known to cause huge performance overhead for best of class server processors. Decisions can be made by processing the intelligence embedded in XML documents to enable business to business transactions as well as other information exchange. However, due to the performance overload on the best of class server processors from analyzing XML documents, they cannot be used in systems that require network line rate XML processing to provide intelligent networking. There is a clear need for acceleration solutions for XML document parsing and content inspection at network line rates which are approaching 1 Gbps and 10 Gbps, to realize the benefits of a dynamic web based on XML services.

Regular expressions can be used to represent the content search strings for a variety of applications like those discussed above. A set of regular expressions can then form a rule set for searching for a specific application and can be applied to any document, file, message, packet or stream of data for examination of the same. Regular expressions are used in describing anti-spam rules, anti-virus rules, anti-spyware rules, anti-phishing rules, intrusion detection rules, intrusion prevention rules, extrusion detection rules, extrusion prevention rules, digital rights management rules, legal compliance rules, worm detection rules, instant message inspection rules, VOIP security rules, XML document security and search constructs, genetics, proteomics, XML based protocols like XMPP, web search, database search, bioinformatics, signature recognition, speech recognition, web indexing and the like. These expressions get converted into NFAs or DFAs for evaluation on a general purpose processor. However, significant performance and storage limitations arise for each type of the representation. For example an N character regular expression can take up to the order of $2^N$ memory for the states of a DFA, while the same for an NFA is in the order of N. On the other hand the performance for the DFA evaluation for an M byte input data stream is in the order of M memory accesses and the order of (N*M) processor cycles for the NFA representation on modern microprocessors.

When the number of regular expressions increases, the impact on the performance deteriorates as well. For example, in an application like anti-spam, there may be hundreds of regular expression rules. These regular expressions can be evaluated on the server processors using individual NFAs or DFAs. It may also be possible to create a composite DFA to represent the rules. Assuming that there are X REs for an application, then a DFA based representation of each individual RE would result up to the order of $(X*2^N)$ states however the evaluation time would grow up to the order of (X*N) memory cycles. Generally, due to the potential expansion in the number of states for a DFA they would need to be stored in off chip memories. Using a typical access time latency of main memory systems of 60 ns, it would require about (X*60 ns* N*M) time to process an X RE DFA with N states over an M byte data stream. This can result in tens of Mbps performance for modest size of X, N & M. Such performance is obviously significantly below the needs of today's network line rates of 1 Gbps to 10 Gbps and beyond. On the other hand, if a composite DFA is created, it can result in an upper bound of storage in the order of $2^{N*X}$ which may not be within physical limits of memory size for typical commercial computing systems even for a few hundred REs. Thus the upper bound in memory expansion for DFAs can be a significant issue. Then on the other hand NFAs are non-deterministic in nature and can result in multiple state transitions that can happen simultaneously. NFAs can only be processed on a state of the art microprocessor in a scalar fashion, resulting in multiple executions of the NFA for each of the enabled paths. X REs with N characters on average can be represented in the upper bound of (X*N) states as NFAs. However, each NFA would require M iterations for an M-byte stream, causing an upper bound of (X*N*M* processor cycles per loop). Assuming the number of processing cycles are in the order of 10 cycles, then for a best of class processor at 4 GHz, the processing time can be around (X*N*M*2.5 ns), which for a nominal N of 8 and X in tens can result in below 100 Mbps performance. There is a clear need to create high performance regular expression based content search acceleration which can provide the performance in line with the network rates which are going to 1 Gbps and 10 Gbps.

The methods for converting a regular expression to Thompson's NFA and DFA are well known. The resulting automata are able to distinguish whether a string belongs to the language defined by the regular expression however it is not very efficient to figure out if a specific sub-expression of a regular expression is in a matching string or the extent of the string. Tagged NFAs enable such queries to be conducted efficiently without having to scan the matching string again. For a discussion on Tagged NFA refer to the paper "NFAs with Tagged Transitions, their Conversion to Deterministic Automata and Application to Regular Expressions", by Ville Laurikari, Helsinki University of Technology, Finland.

SUMMARY OF THE INVENTION

A Programmable Intelligent Search Memory™ (PRISM™) of my invention is a memory technology that supports orders of magnitude larger number of regular expressions in a single chip for current and emerging content search applications. There is a need for creating a compiler flow that can target converting regular expression rules in to a form that PRISM based search engines can use to process input data for content specified by the regular expression rules. My invention describes a compiler for regular expressions that can be used for PRISM.

The high performance programmable intelligent content search memory can have myriad of uses wherever any type of content needs to be searched for example in networking, storage, security, web search applications, XML processing, bio informatics, signature recognition, genetics, proteomics, speech recognition, database search, enterprise search and the like. The programmable intelligent search memory of my invention may be embodied as independent PRISM memory integrated circuits working with or may also be embodied within microprocessors, multi-core processors, network processors, TCP Offload Engines, network packet classification engines, protocol processors, regular expression processors, content search processors, network search engines, content addressable memories, mainframe computers, grid computers, servers, workstations, personal computers, laptops, notebook computers, PDAs, handheld devices, cellular phones, wired or wireless networked devices, switches, routers, gateways, unified threat management devices, firewalls, VPNs, intrusion detection and prevention systems, extrusion detection systems, compliance management systems, wearable computers, data warehouses, storage area network devices, storage systems, data vaults, chipsets and the like or their derivatives or any combination thereof.

The regular expressions may optionally be tagged to detect sub expression matches beside the full regular expression match. The regular expressions are converted into equivalent FSAs that may optionally be NFAs and may optionally be converted into tagged NFAs. The PRISM memory also optionally provides ternary content addressable memory functionality. So fixed string searches may optionally be programmed into the PRISM™ memory of my invention. PRISM memory of this invention enables a very efficient and compact realization of intelligent content search using FSA to meet the needs of current and emerging content search applications. For clarity, as used in this patent the terms "programmable intelligent search memory", "search memory", "content search memory", or "PRISM memory" are used interchangeably and have the same meaning unless specifically noted. Further for clarity, as used in this patent the term "memory" when used independently is used to refer to random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories.

The PRISM memory performs simultaneous search of regular expressions and other patterns (also referred to as "rules" or "regular expression rules" or "pattern search rules" or "patterns" or "regular expressions" in this patent) against the content being examined. The content may be presented to the search memory by a companion processor or PRISM controller or content stream logic or a master processor or the like which may be on the same integrated circuit chip as the PRISM memory or may be on a separate device. The content to be searched may be streaming content or network packets or data from a master processor or data from a disk or a file or reside in on-chip memory or off-chip memory or buffers or the like from which a controller may present it to the search memory arrays for examination. The content search memory arrays may initially be configured with the regular expression rules converted into NFAs or tagged NFAs and optionally other pattern search rules. I describe a compiler for converting regular expressions into rules supported by PRISM. PRISM memory may optionally comprise of configuration control logic which may be distributed or central or a combination thereof. The configuration control logic may optionally address PRISM memory cells to read and/or write FSA rules or other patterns to be searched. Once the PRISM memory is setup with all the related information about the NFAs and other rules, the content to be examined can be presented to the PRISM memory. PRISM memory provides capabilities to update rules or program new rules or additional rules, in line with the content examination within a few clock cycles unlike the current regular expression processors which require the content evaluation to stop for long periods of time until large tables of composite DFAs are updated in an external or internal memory. Typically the content is presented as a stream of characters or symbols which get examined against the rules in the PRISM memory simultaneously and whenever a rule is matched the PRISM memory array provides that indication as a rule match signal which is interpreted by the control logic of the PRISM. There may be multiple rule matches simultaneously in which case a priority encoder which may also be programmable is used to select one or more matches as the winner(s). The priority encoder may then provide a tag or an address or an action or a combination that may have already been programmed in the priority encoder which may be used to look-up related data from associated on-chip or off-chip memory that may optionally determine the next set of actions that may need to be taken on the content being examined. For example, in case of a security application if a set of regular expressions are defined and programmed for spam detection, then if one or more of these rules when matched can have action(s) associated with them that the message or content may need to quarantined for future examination by a user or it can have an action that says the content should be dropped or enable a group of regular expressions in the PRISM memory to be applied to the content or the like depending on the specific application. The PRISM memory architecture comprises of means or circuits or the like for programming and reprogramming of the FSA rules and optionally CAM signatures and masks. It further comprises of means or circuits or the like to stream the content to be searched to the PRISM memory arrays. It may further comprise of priority encoder which may optionally be programmable. The PRISM memory may optionally comprise of random access memory (on-chip or off-chip) which is used to store actions associated with specific rule matches. The PRISM memory may optionally comprise of database extension ports which may be optionally used when the number of rules is larger than those that may fit in a single integrated circuit chip. The PRISM memory may optionally comprise of clusters of PRISM memory cells that enable a group of FSA rules to be programmed per cluster. The PRISM clusters may optionally comprise of memory for fast storage and retrieval of FSA states for examination of content that belongs to different streams or contexts or flows or sessions or the like as described below referred to as context memory. For clarity, context memory or global context memory or local context memory or cluster context memory, all comprise of memory like random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories as discussed above. The PRISM memory may optionally comprise of global context memory beside the local cluster context memory for storage and retrieval of FSA states of different contexts and enable supporting a large number of contexts. The cluster context memory may optionally cache a certain number of active contexts while the other contexts may be stored in the global context memory. There may optionally be off-chip context memory as well, which can be used to store and retrieve FSA states for much larger number of contexts. The PRISM memory may optionally comprise of cache or context control logic (also referred as "context controller") that manages the cluster, global or external context memory or cache or a combination thereof. The cache or context control logic may optionally be distributed per cluster or may be central for the PRISM memory or any combination thereof. The PRISM controller or the content stream logic that streams the content to be searched may be provided with an indication of the context of the content being searched or it may detect the context of the content or a combination thereof, and may optionally direct the context memory and associated control logic i.e. the context controller to get the appropriate context ready. Once the context memory has the required context available an indication may be provided to PRISM configuration control logic that it may program or load the context states in the PRISM memory. The PRISM configuration control logic (also referred as configuration controller in this patent) may optionally first save the current context loaded in the set of active FSA blocks before loading the new context. The configuration controller(s) and the context controller(s) may thus optionally store and retrieve appropriate contexts of the FSAs and start searching the content against the programmed rules with appropriate context states of the FSAs restored. Thus PRISM memory may optionally dynamically reconfigure itself at run-time based on the context of the content or the type of the application or the like or a combination thereof enabling run-time adaptable PRISM memory architecture. The contexts as referred to in this patent may, as examples without limitation, be related to specific streams, or documents, or network connections or message streams or sessions or the like. The PRISM memory may process content from multiple contexts arriving in data groups or packets or the like. For content search in applications where the content belonging to one context may arrive interspersed with content from other contexts, it may be important to maintain the state of the content searched for a context up to the time when content from a different context gets searched by PRISM memory. The context memory or cache with the associated controllers as described in this patent enable handling of multiple contexts.

For clarification, the description in this patent application uses term NFA to describe the NFAs and optionally, when tagging is used in regular expressions, to describe tagged NFA unless tagged NFA is specifically indicated. All NFAs may optionally be tagged to form tagged NFAs, hence the description is not to be used as a limiter to apply only to tagged NFAs. The descriptions of this patent are applicable for non-tagged NFAs as well and tagging is an optional function which may or may not be implemented or used, and thus non-tagged NFAs are covered by the teachings of this patent as will be appreciated by one skilled in the art. At various places in this patent application the term content search memory, content search memory, search memory and the like are used interchangeably for programmable intelligent search memory or PRISM memory. These usages are meant to indicate the content search memory or PRISM memory of this invention without limitation.

Berry and Sethi in their paper "From Regular Expressions to Deterministic Automata" Published in Theoretical Computer Science in 1986, showed that regular expressions (REs) can be represented by NFAs such that a given state in the state machine is entered by one symbol, unlike the Thompson NFA. Further, the Berry-Sethi NFAs are E-free. A 'V' term RE can be represented using 'V+1' states NFA using Berry-Sethi like NFA realization method. The duality of Berry-Sethi method also exists where all transitions that lead the machine out of a state are dependent on the same symbol. This is shown in the paper "A Taxonomy of finite automata construction algorithms" by Bruce Watson published in 1994 in section 4.3. I show a method of creating NFA search architecture in a memory leveraging the principles of Berry-Sethi's NFA realization and the dual of their construct. The NFA search memory is programmable to realize an arbitrary regular expression using the compiler flow of this invention to convert a regular expression to that usable by PRISM. The compiler of this invention follows the principles of Berry-Sethi FSA construction to convert regular expressions into an FSAs and creates various data structures that are required for PRISM to operate as a programmable regular expressions engine.

This PRISM memory and the compiler for PRISM of this patent may be used for many applications like those for detecting intrusions, extrusions and confidential information disclosure (accidental or malicious or intended), regulatory compliance search using hardware for regulations like HIPAA, Sarbanes-Oxley, Graham-Leach-Bliley act, California security bills, security bills of various states and/or countries and the like, deep packet inspection, detecting spam, detecting viruses, detecting worms, detecting spyware, detecting digital rights management information, instant message inspection, URL matching, application detection, detection of malicious content, and other content, policy based access control as well as other policy processing, content based switching, load balancing, virtualization or other application layer content inspection for application level protocol analysis and processing for web applications based on HTTP, XML and the like and applying specific rules which may enable anti-spam, anti-virus, other security capabilities like anti-spyware, anti-phishing and the like capabilities. The content inspection memory may be used for detecting and enforcing digital rights management rules for the content. The content inspection memory may also be used for URL matching, string searches, content based load balancing, sensitive information search like credit card numbers or social security numbers or health information or the like. Classification of network traffic is another task that consumes up to half of the processing cycles available on packet processors leaving few cycles for deep packet inspection and processing at high line rates. The described content search memory can significantly reduce the classification overhead when deployed as companion search memory to packet processors or network processors or TOE or storage network processors or the like.

BRIEF DESCRIPTION OF THE DRAWINGS

FIG. 1a illustrates Thompson's NFA (prior art)
FIG. 1b illustrates Berry-Sethi NFA (prior art)
FIG. 1c illustrates DFA (prior art)
FIG. 2a illustrates a left-biased NFA and state transition table (prior art)
FIG. 2b illustrates a right-biased NFA and state transition table (prior art)
FIG. 3a illustrates state transition controls
FIG. 3b illustrates configurable next state tables per state
FIG. 4a illustrates state transition logic (STL) for a state
FIG. 4b illustrates a state logic block
FIG. 5a illustrates state transition logic (STL) for a state in Left-Biased FSA
FIG. 5b illustrates state transition logic (STL) for a state in Right-Biased FSA FIG. 6A illustrates Right-biased Tagged FSA Rule block in PRISM FIG. 6B illustrates Left-biased Tagged FSA Rule block in PRISM FIG. 7 illustrates PRISM Block Diagram FIG. 8a illustrates PRISM Memory Cluster Block Diagram FIG. 8b illustrates PRISM Memory Cluster Detailed Block Diagram FIG. 9 illustrates PRISM search compiler flow (full + incremental rule distribution)

FIG. 10 illustrates PRISM FSA Compiler flow

DESCRIPTION

I describe a regular expression compiler for high performance Programmable Intelligent Search Memory for searching content with regular expressions as well as other pattern searches. The regular expressions may optionally be tagged to detect sub expression matches beside the full regular expression match. The regular expressions are converted into equivalent FSAs that may optionally be NFAs and may optionally be converted into tagged NFAs. The PRISM memory also optionally supports ternary content addressable memory functionality. So fixed string searches may optionally be programmed into the PRISM memory. PRISM memory enables a very efficient and compact realization of intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters. A compiler for compiling these regular expression rules into PRISM compatible data structure is described in this invention to enable PRISM to perform the content inspection using the compiled rules. The PRISM memory performs simultaneous search of regular expressions and other patterns. The content search memory can perform high speed content search at line rates from 1 Gbps to 10 Gbps and higher, when the best of class server microprocessor can only perform the same tasks at well below 100 Mbps. The content search memory can be used not only to perform layer 2 through layer 4 searches that may be used for classification and security applications, it can also be used to perform deep packet inspection and layer 4 through layer 7 content analysis.

Following are some of the embodiments, without limitations, that can implement PRISM memory:

The PRISM memory may be embodied inside network interface cards of servers, workstations, client PCs, notebook computers, handheld devices, switches, routers and other networked devices. The servers may be web servers, remote access servers, file servers, departmental servers, storage servers, network attached storage servers, database servers, blade servers, clustering servers, application servers, content/media servers, VOIP servers and systems, grid computers/servers, and the like. The PRISM memory may also be used inside an I/O chipset of one of the end systems or network core systems like a switch or router or appliance or the like. The PRISM memory may also be embodied on dedicated content search acceleration cards that may be used inside various systems described in this patent. Alternatively, PRISM memory may also be embodied as a content search memory inside a variety of hardware and/or integrated circuits like ASSPs, ASICs, FPGA, microprocessors, multi-core processors, network processors, TCP Offload Engines, network packet classification engines, protocol processors, regular expression processors, content search processors, mainframe computers, grid computers, servers, workstations, personal computers, laptops, handheld devices, cellular phones, wired or wireless networked devices, switches, routers, gateways, XML accelerators, VOIP servers, Speech recognition systems, bio informatics systems, genetic and proteomics search systems, web search servers, electronic vault application networks and systems, Data Warehousing systems, Storage area network systems, content indexing appliances like web indexing, email indexing and the like, chipsets and the like or any combination thereof. Alternatively, PRISM memory blocks may be embedded inside other memory technologies like DRAM, SDRAM, DDR DRAM, DDR II DRAM, RLDRAM, SRAM, RDRAM, FCRAM, QDR SRAM, DDR SRAM, CAMs, Boundary Addressable Memories, Magnetic memories, Flash or other special purpose memories or a combination thereof or future derivates of such memory technologies to enable memory based content search.

One preferred embodiment of the invention is in an integrated circuit memory chip that may support around 128,000 8-symbol regular expression rules in current process technologies. A second preferred embodiment of the PRISM technology is an integrated circuit memory chip that may support around 8,000 regular expression rules in current process technologies to support applications where a lower content search memory cost is required. Each process generation may provide ability to store around twice as many PRISM memory bits as the previous generation. Thus in one preferred embodiment the PRISM memory would be able to support tens of thousands of eight state FSA and can potentially support over 100,000 FSAs. There are many variations of the PRISM memory architecture that can be created that can support more or less FSAs depending upon various factors like the number of states per FSA, the chip die area, cost, manufacturability expectations and the like which will be appreciated by a person with ordinary skill in the art.

DETAILED DESCRIPTION

I describe a regular expression compiler for high performance Programmable Intelligent Search Memory for searching content with regular expressions as well as other pattern searches. The regular expressions may optionally be tagged to detect sub expression matches beside the full regular expression match. The regular expressions are converted into equivalent FSAs or NFAs and optionally into tagged NFAs. The PRISM memory also optionally supports ternary content addressable memory functionality. So fixed string searches may optionally be programmed into the PRISM memory of my invention. PRISM memory of this invention enables a very efficient and compact realization of intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters. The PRISM memory performs simultaneous search of regular expressions and other patterns. The content search memory can perform high speed content search at line rates from 1 Gbps to 10 Gbps and higher using current process technologies. The description here is with respect to one preferred embodiment of this invention in an integrated circuit (IC) chip, it will be appreciated by those with ordinary skill in the art that changes in these embodiments may be made without departing from the principles and spirit of the invention. The illustrations are made to point out salient aspects of the invention and do not illustrate well understood IC design elements, components and the like implementation of the invention in integrated circuits so as not to obscure the invention.

Ability to perform content search has become a critical capability in the networked world. As the network line rates go up to 1 Gbps, 10 Gbps and higher, it is important to be able to perform deep packet inspection for many applications at line rate. Several security issues, like viruses, worms, confidential information leaks and the like, can be detected and prevented from causing damage if the network traffic can be inspected at high line rates. In general, content search rules can be represented using regular expressions. Regular expression rules can be represented and computed using FSAs. NFAs and DFAs are the two types of FSAs that are used for evaluation of regular expressions. For high line rate applications a composite DFA can be used, where each character of the input stream can be processed per cycle of memory access. However, this does have a limit on how fast the search can be performed dictated by the memory access speed. Another limiter of such approach is the amount of memory required to search even a modest number of regular expression rules. As discussed above, NFAs also have their limitations to achieve high performance on general purpose processors. In general, today's best of class microprocessors can only achieve less than 100 Mbps performance using NFAs or DFAs for a small number of regular expressions. Hence, there is a clear need to create targeted content search acceleration hardware to raise the performance of the search to the line rates of 1 Gbps and 10 Gbps. PRISM memory is such a high performance content search hardware that can be targeted for high line rates. The invention of this patent describes a compiler to make PRISM memory structures useful for processing content against a large number of regular expressions compiled to leverage PRISM capabilities.

As described earlier, regular expression can be represented using FSA like NFA or DFA. FIG. 1a illustrates Thompson's construction for the regular expression (xy+y)*yx. Thompson's construction proceeds in a step by step manner where each step introduces two new states, so the resulting NFA has at most twice as many states as the symbols or characters and operators in the regular expression. An FSA is comprised of states, state transitions, and symbols that cause the FSA to transition from one state to another. An FSA comprises at least one start state, and at least one accept state where the start state is where the FSA evaluation begins and the accept state is a state which is reached when the FSA recognizes a string. Block 101 represent the start state of the FSA, while block 105 is an accept state. Block 102 represents state 2 and 104 represents state 3. The transition from state 2 to state 3 is triggered on the symbol x, 103 and is represented as a directed edge between the two states. Thompson's NFA comprises of 'ϵ' transitions, 116, which are transitions among states which may be taken without any input symbol.

FIG. 1b illustrates Berry-Sethi NFA for the regular expression (xy+y)*yx. Berry and Sethi described an algorithm of converting regular expressions into FSA using a technique called 'marking' of a regular expression. It results in an NFA which has a characteristic that all transitions into any state are from the same symbol. For example, all transitions into state 1, 107, are from symbol 'x'. The other characteristic of the Berry-Sethi construct is that number of NFA states are the same as the number of symbols in the regular expression and one start state. In this type of construction, each occurrence of a symbol is treated as a new symbol. The construction converts the regular expression (xy+y)*yx to a marked expression $(x_1y_2+y_3)^*y_4x_5$ where each x, leads to the same state, 107. The figure does not illustrate the markings. Once the FSA is constructed the markings are removed. The FIG. 1b illustrates the NFA with the markings removed. As can be seen from the figure, in Berry-Sethi construction all incoming transitions into a state are all dependent on the same symbol. Similarly, a duality of Berry-Sethi construct also has been studied and documented in the literature as discussed earlier, where instead of all incoming transitions being dependent on the same symbol, all outgoing transitions from a state are dependent on the same symbol. The Berry-Sethi construct is also called a left-biased type of construct, where as its dual is called a right-biased construct.

Finite State Automaton can evaluate incoming symbols or characters against the regular expression language of the automaton and detect when an input string is one of the strings recognized by it. However, it is advantageous in certain conditions to know if a certain sub-expression of the regular expression is also matched. That may be enabled by tagging the NFA as described in the paper by Ville Laurikari referred earlier. Following description illustrates how the inventions of this patent enable tagged NFA realization in PRISM memory. The tagging for sub-expression checking may involve further processing of the FSA to uniquely identify sub-expression matching. However for illustration purpose, if in the regular expression "(xy+y)*y" if one desires to detect if the sub-expression "xy" is in the recognized string, one can tag the state 4, 110, as a tagged state. Thus, whenever the regular expression transitions through state 4, 110, the sub-expression match or tag match may be indicated. There may also be need to detect if a specific transition leads the regular expression through a desired sub-expression. In such a case a tag start state and a tag end state may be marked. For instance, if it is desired to detect if the transition from state 0 to state 2, 117, is taken then the state 0 may be marked as a tag start state and state 2 may be marked as a tag end state. The tagged FSA implementation may then indicate the beginning of the tag transition when the FSA reaches the tag start state and then indicate the end of the tag transition when the FSA reaches the tag end state. If the FSA moves from the tag start state immediately followed by transitioning into tag end state, then the tagged FSA can indicate the match of a tagged transition. The illustrations in the description below do not illustrate this aspect of tagged NFA, though it may optionally be supported in PRISM and may be easily implemented as follows or other means for example by adding a tag start and tag end state flags (as memory bits or flip-flops) and the logic for the tag transition detection to follow the steps described above as can be appreciated by those with ordinary skill in the art. The patent of this disclosure enables detection of sub-expressions using tagging.

FIG. 1c illustrates a DFA for the same regular expression (xy+y)*yx. DFA is deterministic in that only one of its states is active at a given time, and only one transition is taken dependent on the input symbol. Whereas in an NFA, multiple states can be active at the same time and transitions can be taken from one state to multiple states based on one input symbol. There are well known algorithms in the literature, like subset construction, to convert a RE or NFA to a DFA. This DFA may be realized in the PRISM Memory using the constructs described below to represent an FSA, using a left-biased realization. Thus PRISM memory of this invention may also be used to program certain DFAs where all incoming transitions to each state are with the same symbol like the DFA of this illustration.

FIG. 2a illustrates a left-biased NFA and its state transition table (prior art). The illustration is a generic four state Berry-Sethi like NFA with all transitions from each node to the other shown with the appropriate symbol that the transition depends on. For example, state A, 201 has all incoming transitions dependent on symbol 'a' as illustrated by example transitions labeled 202 and 203. When the FSA is in State A, 201, an input symbol 'd', transitions the FSA to state D with the transition, 204, from state A to state D. The table in the figure illustrates the same FSA using a state transition table. The column 'PS', 211, is the present state of the FSA, while the row 'sym', 212, is a list of all the symbols that the state transitions depend on. The table 213, illustrates the next state (NS) that the FSA will transition to from the present state (PS) when an input symbol from those in the sym header row is received. In this FSA, state 'A' is the start state and state C is an accept state. Hence, if the FSA is in the present state 'A' and an input symbol 'b' is received, the FSA transitions to the next state 'B'. So when the next input symbol is received, the FSA is in present state 'B' and is evaluated for state transition with the row corresponding to present state 'B'.

FIG. 2b illustrates a right-biased NFA and its state transition table (prior art). The illustration is a generic four state dual of Berry-Sethi NFA with all transitions from each node to the other shown with the appropriate symbol that the transition depends on. For example, state 'A', 205 has all outgoing transitions dependent on symbol 'a' as illustrated by example transitions labeled 208 and 209 where as unlike the left-biased NFA described above, each incoming transition is not on the same symbol, for example transitions labeled 206 and 207 depend on symbols 'b' and 'd' respectively. The state transition table in this figure is similar to the left biased one, except that the FSA transitions to multiple states based on the same input symbol. For example if the FSA is in the present state 'B' and a symbol 'b' is received, then the FSA transitions to all states 'A', 'B', 'C' and 'D'. When an input symbol is received which points the FSA to an empty box, like 216, the FSA has received a string which it does not recognize. The FSA can then be initialized to start from the start state again to evaluate the next string and may indicate that the string is not recognized.

The FIG. 2a and FIG. 2b, illustrate generic four state NFAs where all the transitions from each state to the other are shown based on the left-biased or right-biased construct characteristics. However not all four state NFAs would need all the transitions to be present. Thus if a symbol is received which would require the FSA to transition from the present state to the next state when such transition on the received input symbol is not present, the NFA is said to not recognize the input string. At such time the NFA may be restarted in the start state to recognize the next string. In general, one can use these example four state NFAs to represent any four state RE in a left-biased (LB) or right-biased (RB) form provided there is a mechanism to enable or disable a given transition based on the resulting four states NFA for the RE.

FIG. 3a illustrates state transition controls for a left-biased and right-biased NFA. The figure illustrates a left-biased NFA with a state 'A', 300, which has incoming transitions dependent on receiving input Symbol 'S1' from states 'B', 301, 'C', 302, and 'D', 303. However, the transitions from each of the states 'B', 'C' and 'D' to state 'A', occur only if the appropriate state dependent control is set besides receiving the input symbol 'S1'. The state dependent control for transition from state 'B' to state 'A' is $V_2$ while those from states 'C' and 'D' to state 'A' is $V_3$ and $V_4$ respectively. Transition to the next state 'A' is dependent on present state 'A' through the state dependent control $V_1$. Thus transition into a state 'A' occurs depending on the received input symbol being 'S1' and if the state dependent control for the appropriate transition is set Thus, one can represent any arbitrary four states NFA by setting or clearing the state dependent control for a specific transition. Thus, if a four states left biased NFA comprises of transition into state 'A', from state 'B' and 'C' but not from the states 'A' or 'D', the state dependent controls can be set as $V_1=0, V_2=1, V_3=1$ and $V_4=0$. Hence if the NFA is in state 'D' and a symbol 'S1' is received, the NFA will not transition into state 'A', however if the NFA is in state 'B' and a symbol 'S1' is received the NFA will transition into state 'A'.

Similarly, FIG. 3a also illustrates states and transitions for a right-biased NFA. The figure illustrates a right-biased NFA with a state 'A', 306, which has incoming transitions from state 'B', 307, state 'C', 308, and state 'D', 309, on receiving input symbols 'S2', 'S3' and 'S4' respectively. However, the transitions from each of the states 'B', 'C' and 'D' to state 'A', occur only if the appropriate state dependent control is set besides receiving the appropriate input symbol. The state dependent control for transition from state 'B' to state 'A' is $V_2$ while those from states 'C' and 'D' to state 'A' is $V_3$ and $V_4$ respectively. Transition to the next state 'A' is dependent on present state 'A' through the state dependent control $V_1$. Thus transition into a state 'A' occurs based on the received input symbol and if the state dependent control for the appropriate transition is set. Thus, one can represent any arbitrary four states right-biased NFA by setting or clearing the state dependent control for a specific transition. All state transition controls for a given state form a state dependent vector (SDV), which is comprised of $V_1, V_2, V_3$, and $V_4$ for the illustration in FIG. 3a for the left-biased and the right-biased NFAs.

FIG. 3b illustrates configurable next state table per state. The left-biased state table for 'NS=A', is shown by the table 311, whereas the right-biased state table for 'NS=A', is shown by the table 312. The state dependent vector for both left-biased and right-biased NFA state is the same, while the received input symbol that drive the transition are different for the left-biased vs. right-biased NFA states. Thus a state can be represented with properties like left-biased (LB), right-biased (RB), start state, accept state, SDV as well as action that may be taken if this state is reached during the evaluation of input strings to the NFA that comprises this state.

FIG. 4a illustrates state transition logic (STL) for a state. The STL is used to evaluate the next state for a state. The next state computed using the STL for a state depends on the current state of the NFA, the SDV, and the received symbol or symbols for a left-biased NFA and right-biased NFA respectively. The InChar input is evaluated against symbols 'S1' through 'Sn' using the symbol detection logic, block 400, where 'n' is an integer representing the number of symbols in the RE of the NFA. The choice of 'n' depends on how many states are typically expected for the NFAs of the applications that may use the search memory. Thus, 'n' may be chosen to be 8, 16, 32 or any other integer. The simplest operation for symbol detection may be a compare of the input symbol with 'S1' through 'Sn'. The output of the symbol detection logic is called the received symbol vector (RSV) comprised of individual detection signals 'RS1' through 'RSn'. LB/RB# is a signal that indicates if a left-biased NFA or a right-biased NFA is defined. LB/RB# is also used as an input in evaluating state transition. The STL for a state supports creation of a left-biased as well as right-biased NFA constructs. The LB/RB# signal controls whether the STL is realizing a left-biased or a right-biased construct. The state dependent vector in the form of 'V1' through 'Vn', is also applied as input to the STL. The SDV enables creation of arbitrary 'n'-state NFAs using STL as a basis for a state logic block illustrated in FIG. 4b. Present states are fed into STL as a current state vector (CSV) comprised of 'Q1' through 'Qn'. STL generates a signal 'N1' which gets updated in the state memory, block 402, on the next input clock signal. 'N1' is logically represented as N1=((V1 and Q1 and (LB/RB# OR RS1)) OR (V2 and Q2 and (LB/RB# OR RS2)) OR . . . (Vn and Qn and (LB/RB# OR RSn)) AND ((NOT LB/RB# OR RS1). Similar signal for another state 'n', would be generated with similar logic, except that the signal 401, feeding into the OR gate, 415, would be 'RSn', which is the output of the 'n'-th symbol detection logic, changing the last term of the node 'N1' logic from ((NOT LB/RB# OR RS1) to ((NOT LB/RB# OR RSn). The state memory, 402, can be implemented as a single bit flip-flop or a memory bit in the state logic block discussed below.

FIG. 4b illustrates a state logic block (SLB). The SLB comprises the STL, 406, Init logic, 408, state memory, 410, the accept state detect logic, 411, the SDV for this state, 407, start flag, 409, accept flag, 412, tag associated with this state, 419, or action associated with this state, 413 or a combination of the foregoing. The SLB receives current state vector and the received symbol vector which are fed to STL to determine the next state. The realization of a state of an arbitrary NFA can then be done by updating the SDV for the state and selecting the symbols that the NFA detects and takes actions on. Further, each state may get marked as a start state or an accept state or tagged NFA state or a combination or neither start or accept or tagged state through the start, tag and accept flags. The init logic block, 408, receives control signals that indicate if the state needs to be initialized from the start state or cleared or disabled from updates, or loaded directly with another state value, or may detect a counter value and decide to accept a transition or not and the like. The init block also detects if the FSA has received a symbol not recognized by the language of the regular expression and then may take the FSA into a predefined initial state to start processing the stream at the next symbol and not get into a state where it stops recognizing the stream. The Init block can be used to override the STL evaluation and set the state memory to active or inactive state. The STL, 406, provides functionality as illustrated in FIG. 4a, except that the state memory is included in the SLB as independent functional block, 410. The state memory, 410, can be implemented as a single bit flip-flop or a memory bit. When the state memory is set it indicates that the state is active otherwise the state is inactive. The accept detect logic, 411, detects if this state has been activated and if it is an accept state of the realized NFA. If the state is an accept state, and if this state is reached during the NFA evaluation, then the associated action is provided as an output of the SLB on the A1 signal, 416, and an accept state activation indicated on M1, 417. If the FSA reaches a state which is flagged as a tagged state using the tag flag, then the match detect logic may indicate a tag match, not illustrated, which another circuit can use to determine the action to be taken for the particular tag. The action could be set up to be output from the SLB on the state activation as an accept state as well as when the state is not an accept state, like a tagged state, as required by the implementation of the NFA. This can enable the SLB to be used for tagged NFA implementation where an action or tag action can be associated with a given transition into a state.

If there are 'n' states supported per FSA rule, then each SLB needs 'n'-bit SDV which can be stored as a n-bit memory location, 3 bits allocated to start, tag and accept flags, 1-bit for LB/RB#, m-bit action storage. Thus if n=16 and m=6, then the total storage used per SLB would be a 26-bit register equivalent which is a little less than 4 bytes per state. If tag start flag and tag end flags are supported, not illustrated, then the number of memory bits would be 28-bits. If multiple tagged expressions need to be enabled then the number of bits for tagging may be appropriately increased.

FIG. 5a illustrates State transition logic (STL) for a state in a left-biased FSA. This figure illustrates state transition logic for a state of an FSA when the logic illustrated above for FIG. 4a is simplified with the LBIRB# set to active and symbol detection logic for one of the states illustrated. The symbol bits are illustrated as 'm-bit' wide as $S_{1m} \ldots S_{11}$ illustrated in block 502. The input character symbol bits are labeled as $cln_m \ldots cln_1$, 501. The symbol detection logic illustrated in FIG. 4a, 400, is illustrated as individual bits labeled $E_m \ldots E_1$, 503, and is also referred to as symbol evaluation logic in this patent. The symbol dependent vector is labeled $V_{n1} \ldots V_{11}$, 504 which indicates the symbol dependent vector bit enabling transition into state 1 from each of the 'n' states that represent the CSV, $Q_n \ldots Q_1$, 509, of the FSA. RS1, 505, is the result of the evaluation of the input character symbol with one symbol of the FSA, $S_{1m} \ldots S_{11}$ illustrated in block 502. The logic gates, 506 and 507, are NAND gates that form the logic function to generate the next state, Q1, based on the RS1, SDV, $V_{n1} \ldots V_{11}$, and CSV, $Q_n \ldots Q_1$. States $Q_n \ldots Q_2$ would be generated using similar circuit structure as the one illustrated in FIG. 5a, except the RSV bit, SDV and the symbol specific to the particular state will be used. For example, for the generation of state $Q_n$ the Symbol would be $S_{nm} \ldots S_{n1}$, the SDV vector would be $V_{nn} \ldots V_{1n}$, and the RSV bit would be RSn instead of RS1.

FIG. 5b illustrates State transition logic (STL) for a state in a right-biased FSA. This figure illustrates state transition logic for a state when the logic illustrated above for FIG. 4a is simplified with the LB/RB# set to inactive state and symbol detection logic for one of the states illustrated. Key differences between the right biased FSA circuit illustrated in this figure and the left-biased FSA illustrated in FIG. 5a, is that the next state generation logic depends on all received symbol vector bits, RS1, 505, through RSn, 505n, which are the result of the evaluation of the input character symbol with each of the 'n' symbols of the FSA instead of only one RSV bit, RS1, 505, illustrated in FIG. 5a. The logic gates, 506a and 507b, represent the right-biased FSA logic function to generate the next state based on the RSV, RS1, 505, through RSn, 505n, SDV, $V_{n1} \ldots V_{11}$, and CSV, $Q_n \ldots Q_1$. States $Q_n \ldots Q_2$ would be generated using similar circuit structure as the one illustrated in FIG. 5b, except the SDV and the symbol specific to the particular state will be used. For example, for the generation of state $Q_n$ the Symbol would be $S_{nm} \ldots S_{n1}$, the SDV vector would be $V_{nn} \ldots V_{1n}$, and the RSV vector would be the same, RS1, 505, through RSn, 505n.

PRISM memory allows various elements of the FSA blocks to be programmable such that the compiler of this invention can accept a regular expression and compile it with information for various PRISM state elements to make the general purpose programmable state machine of PRISM FSA to implement the specific regular expression rule. The compiler can compile other rules and later replace the current rule with another rule in the same PRISM FSA or may use another PRISM FSA or a combination of the like.

FIG. 6A illustrates Right-biased Tagged FSA Rule block in PRISM. As discussed earlier the FSA of PRISM are optionally Tagged. For clarity, FSA rule block, PRISM FSA rule block, PRISM FSA rule memory block, rule block, rule memory block, are used interchangeable in this application. Further, NFA rule block or PRISM NFA rule block or NFA rule memory block, are also used interchangeably and mean a PRISM FSA rule block where the FSA type is an NFA in this patent. The discussion below is with respect to tagged NFA, though it is also applicable for non-tagged NFAs or other FSA types where the tagging elements, described below, are not used or not present. This figure illustrates a state block 1, 601, which comprises of some elements of the state transition logic illustrated in FIG. 5b. The figure illustrates other state blocks, 602 and 603, that represent state blocks 2 through n, where 'n' is the number of states of the NFA or FSA programmed in this PRISM FSA rule block. These blocks are illustrated without details unlike state block 1. The primary difference between the blocks is that each state block generates its own RSV bit and uses only its own state bit from the CSV. For instance state block 2, generates RS2 by evaluating the received character with the symbol programmed in its symbol logic block which is similar to block 502. The state blocks are organized slightly differently than the illustration in FIG. 5b. The logic for one state illustrated in FIG. 5b, is illustrated to organized in a vertical slice like, 614, where each state block holds portion of the logic necessary to form the final state. In this illustration the state Qn, 508n, is generated by processing the outputs from each state blocks's 'n'-th slice. The SDV vector bits held in each state block are for transition control from the specific state to all other states. For instance the blocks, like 504a, hold different members of the SDV vectors compared to the blocks, like 504. Thus the SDV for each state is distributed amongst multiple state blocks unlike that illustrated in FIG. 5b. For example state block 1, holds SDV vector bits $V_{1n}$, $V_{1(n-1)}$ through $V_{11}$ indicating state transition vector bits for transitioning out of state 1 to the 'n' states, unlike FIG. 5b which are transposed where the state transition logic for a state holds bits $V_{n1}$, $V_{(n-1)1}$ through $V_{11}$ for transition into state 1. The indices $V_{XY}$ indicate the state dependent vector bit that enables or disables transition from state X to state Y where each X and Y may have a range from 1 through n, where n is the number of states of the FSA. Thus the SDV of a state indicates the controls for enabling transitions from any state to itself as illustrated in 504, which indicates SDV transition controls from states n through 1 to state 1. As can be noticed the indices of the vector bits are reversed between the FIG. 5b and FIG. 6a. Thus a specific state's SDV is distributed in multiple state blocks and is illustrated aligned vertically like slice 614. This figure also illustrates the initialization logic, 408, illustrated in FIG. 4b as block 605 that affects what value gets loaded in the state memory bit, 508n, under different conditions like initialization, startup, error state, store and load or context switch and the like. Thus SDV vectors for an FSA are written to the FSA rule block in a state transposed manner as described above. The initialization block comprises of initialization/start state vector memory bits. Thus the input into the init block, 605, is logically equivalent to the node N1b in FIG. 5b, adjusted for the appropriate state bit. The state control block, 604, comprises of the logic gates, 507a, which logically NANDs the partial state output, like 615, from the state blocks 1 through state block n. The state control block, 604, further comprises of the init logic blocks, like 605, and the state memory blocks, like 508a. The FSA Rule block also comprises of tagged match detect block, 613, which may optionally comprise of tagging elements for supporting tagged NFAs. The tagged match detect block comprises of Accept vector blocks, like 610, which comprise of accept vector memory bits and may optionally comprise of tag memory bits. The tagged match detect block further comprises of accept detect blocks, like 611, which comprise of accept state detection and may optionally comprise of tagged state or state transition detection logic. The state memory blocks, like 508, may be controlled be clock or enable or a combination signals to step the FSA amongst its states as new input characters are evaluated. The clocked enable signals may provide more control over simple clock by enabling when the FSA should be evaluated. For instance upon finding a match, the FSA controller, 802, described below may be programmed to hold further evaluation of any symbols for this FSA until the match information is processed. The FSA rule block generates multiple output signals that can be used to indicate the progress of the FSA. The FSA rule block outputs comprise of a Rule Match, 609, which indicates when the regular expression rule programmed in the NFA rule block is matched with characters of the input stream. The Rule Match signal may be used by the local or global priority encoder and evaluation processor, blocks 815 and 713 respectively described below, to decide on next steps to be taken based on user programmed actions and/or policies. The priority encoder and evaluation processors may optionally comprise of counters that may be triggered upon specific rule matches. The counters may be used for several purposes like statistical events monitoring, match location detection in the input stream and the like. The priority encoders may also decide the highest priority winner if multiple matches are triggered and then the output may be used to find the appropriate action associated with the matched regular expression rule. The FSA rule block output may optionally comprise of Tag Match signal(s) that may be used by the priority encoders and evaluation processors to detect partial regular expression matches. The number of tag match signals per FSA rule block may depend on the number of sub-expressions that are allowed to be detected in a given NFA. The FSA rule block is organized as a series of memory locations that each hold a portion of the NFA rule evaluation information using memory circuits like the SDV memory, Symbols memory, Mask vectors memory (discussed below), initialization or start state vector memory, accept state vector memory, optionally tag state flag or vector memory, the FSA states memory or current state vector memory and the like. The FSA rule block comprises of FSA evaluation circuits interspersed amongst the memory blocks storing the FSA programmable information like the SDV, start state, accept state, symbols and the like. The FSA rule blocks evaluate multiple symbols against input stream for matches to step the FSA. Each symbol evaluation block, like 503, may optionally output an indication of a pattern comparison between the input character or symbol and the programmed symbol. These output signals, like 614, 616, 617, can be treated as local content addressable memory match signals. The PRISM memory may optionally support logic that enables generating merged CAM match signals from multiple FSA rule blocks organized in PRISM memory clusters, which may in turn be laid out in rows and columns of PRISM FSA rule blocks, to support larger width pattern matches. Thus the PRISM memory can be used as content addressable memory when enabled to process the CAM match signals. The PRISM memory can be optionally configured such that portions of the memory support CAM functionality while other portions may support FSA functionality or the entire PRISM memory may optionally be configured to behave like FSA memory or CAM memory. The CAM memories typically support functionality to detect 4 byte patterns, 18 byte patterns or even 144 byte patterns. PRISM memory may optionally provide configuration mechanisms to support similar large pattern evaluation by chaining multiple FSA rule blocks' CAM match signals using appropriate logic to generate composite CAM match signals for desired pattern width.

FIG. 6B illustrates Left-biased Tagged FSA Rule block in PRISM. As discussed earlier the FSA of PRISM are optionally Tagged. The discussion below is with respect to tagged NFA, though it is also applicable for non-tagged NFAs or other FSA types where the tagging elements, described below, are not used or not present. Left-biased FSA Rule blocks are similar in functionality as those discussed above for the Right-biased FSA Rule blocks except for a few minor differences that enable the FSA rule block to behave as a Left-biased FSA. The state blocks, 601a, 602a, 603a, in the left-biased NFAs receive all RSV vector bits, like 505n, unlike a specific RSV bit per state block in the right-biased NFA. The input to NAND gates like 506b, is the specific RSV bit depending on the bit slice at the bit location in the state block of the NAND gate. Thus bit location 'p' where 'p' can range from 1 through 'n', uses RSp (Received Symbol Vector bit 'p') to generate the partial state block output, 615a. By making such a change in the blocks the NFA may now function as a left-biased NFA. The rest of the blocks perform similar functions as described above for a right-biased NFA.

PRISM memory may comprise of left-biased NFAs, right-biased NFAs or left-biased FSA or right-biased FSA or a combination of them or may be comprised as selectable left-biased or right-biased NFAs with logic similar to FIG. 4a. All such variations are within the scope of this invention, as may be appreciated by one with ordinary skill in the art.

FIG. 9 illustrates PRISM search compiler flow which is used for full and incremental rules distribution. For clarity, the PRISM search compiler is also referred to as search compiler or compiler in this patent application and the terms are used interchangeably. The search compiler of FIG. 9 allows an IT manager or user to create and compile the search and security rules of different types as illustrated by 901, 902 and 903, without limitations. Even though, the illustrated rules list primarily security type rules there may be regular expression rules for other application that needs content search like many applications listed in this patent application. The compiler flow would optionally be provided with information about the specific nodes or networked systems or otherwise that may use PRISM and the characteristics of these nodes, like the security capability, the rules communication method, the size of the rule base supported, the performance metrics of the node, deployment location e.g. LAN or SAN or WAN or other, or the like for specific security or network related search applications. The compiler flow may optionally use this knowledge to compile node specific rules from the rule set(s) created by the IT manager or the user. The compiler comprises a rules parser, block 904, for parsing the rules to be presented to the PRISM FSA Compiler Flow, block 906, illustrated further in FIG. 10, which analyzes the rules and creates rules database that needs to be programmed into PRISM memory of the specific nodes or systems for analyzing the content. The rule parser may read the rules from files of rules or directly from the command line or a combination depending on the output of the rule engines like blocks 901, 902 and 903. The rules for a specific node are parsed to recognize the language specific tokens used to describe the rules or regular expression tokens and outputs regular expression (RE) rules, 905. The parser then presents the REs to the PRISM FSA compiler flow which processes the REs and generates NFA for RE. Optionally if tagging is supported by the specific PRISM instance, and if REs use tagging, the PRISM FSA compiler then decides whether the RE will be processed as a NFA or tagged NFA based on the PRISM memory capability. It then generates the NFA or tNFA rule in a format loadable or programmable into PRISM memory and stores the database in the compiled rules database storage, 908.

Rules distribution engine, block 909, then communicates the rules to specific system or systems that comprise of PRISM memory. The search rules targeted to specific systems may be distributed to a host processor or a control processor or other processor of the system that comprises PRISM memory. A software or hardware on the receiving processor may then optionally communicate the rules to the PRISM memory by communicating with the external interface, block 702, and the PRISM controller, block 703, described below to configure and/or program the PRISM memory with the FSA rules. The Rules distribution engine, 909, may optionally communicate directly with the PRISM controller, block 703 through the external interface block 702, if the external interface and PRISM controller optionally support such functionality. The rules may be distributed using a secure link or insecure link using proprietary or standard protocols as appropriate per the specific node's capability over a network.

FIG. 7 illustrates PRISM block diagram. As may be appreciated by one with ordinary skill in the art, that many different variations of these blocks and their configuration, organization and the like can be created from the teachings of this patent and are all covered without limitations. PRISM controller, block 703, communicates with the rules distribution engine, block 909, or with a master processor or a companion processor like a host system microprocessor or a control processor or a network processor or a switch processor or an ASIC based controller or processor or the like to receive appropriate compiled rule tables prior to starting the content inspection. It programs the received rules into the appropriate PRISM FSA rule blocks, described earlier, by working with the address decode and control logic block 704, coupled to the PRISM controller, block 703, and the PRISM memory cluster arrays, block 710. There may be multiple rules being stored in each PRISM memory cluster array's FSA rule blocks. There may optionally be multiple application specific contexts, not illustrated, supported by the PRISM memory cluster arrays. Once the rules distribution engine communicates the compiled rules to the PRISM controller and they are setup or programmed in their respective FSA rule blocks, PRISM memory is ready to start processing the data stream to perform content inspection. The PRISM memory state configuration information is received via the external interface block, 702, which may communicate on a system bus or a network or the like with a master processor or companion processor, not illustrated. The PRISM memory of this patent may be deployed in various configurations like a look-aside configuration or flow-through configuration or an accelerator adapter configuration or may be embedded inside variety of processors or logic or ASICs or FPGA or the like as discussed earlier as well others not illustrated. In a look-aside or an accelerator adapter configuration, the PRISM memory may optionally be under control of a master processor which may be a network processor or a switch processor or a TCP/IP processor or classification processor or forwarding processor or a host processor or a microprocessor or the like depending on the system in which such a card would reside. The PRISM controller, 703, receives the configuration information under the control of such master processor that communicates with the rule engine to receive the configuration information and communicates it to the PRISM memory. Once the configuration is done, the master processor provides packets or data files or content to the PRSIM memory for which content inspection needs to be done. The external interface, 1202, used to communicated with a master processor may be standard buses like PCI, PCI-X, PCI express, RapidIO, HyperTransport or LA-1 or DDR or RDRAM or SRAM memory interface or there derivatives or the like or a proprietary bus. The bandwidth on the bus should be sufficient to keep the content search memory operating at its peak line rate. The PRISM memory may preferably be a memory mapped or may optionally be an IO mapped device in the master processor space for it to receive the content and other configuration information in a look-aside or accelerator configuration. PRISM memory optionally may be polled by the master processor or may provide a doorbell or interrupt mechanism to the master to indicate when it is done with a given packet or content or when it finds a content match to the programmed rules.

The PRISM controller receives incoming data for examination using regular expression rules or for examination using patterns to be matched, and may optionally store them into data buffer/memory, block 707, before presenting it to the PRISM memory cluster arrays. The PRISM memory may optionally directly stream the content to be examined to the content stream logic, block 708, which may stage the content for examination by the PRISM memory cluster arrays, block 710. The PRISM controller maintains the record of the content being processed and once the content is processed it informs the master processor. The PRISM memory duster arrays inform the global priority encoder and evaluation processor, block 713, of the results of the search. When a match to a rule is found the priority encoder and evaluation processor may retrieve an action associated with the rule from the global action memory, block 717, depending on programmable policies and may optionally provide this to the PRISM controller. The PRISM controller may optionally inform the master processor about the search results. The PRISM controller may execute the specific action or policy defined for the rule match. The actions may optionally comprise to stop further content evaluation, enable a certain set of rules to be examined by enabling appropriate cluster array and pass the content through that PRISM memory cluster array for further examination, or inform the master processor of the result and continue further examination or hold the match result in on-chip or off-chip memory or buffers for the master processor to request this information later or any combination thereof or the like. If the PRISM memory is configured to examine network traffic in a flow-through configuration, not illustrated, it may also be programmed to drop the offending packet or stop the specific TCP connection or the session or the like. Optionally the master processor may receive the match information and may take specific actions on the content stream.

The address decode and control logic, block 704, is coupled to the PRISM controller, 703, the external interface, 702, the PRISM memory cluster arrays, 710, the global priority encoder and evaluation processor, 713, the database expansion port, 718 as well as other blocks through a coupling interface, 715. The PRISM memory may support a large number of regular expressions in some preferred embodiments as discussed above, however if there are applications that need more rules, then there may optionally be a database expansion port, 718, which would enable the expansion of the rules by adding additional PRISM memory(ies) to the database expansion port. The database expansion port may provide a seamless extension of the number of rules and may use additional memory space in the host or master processor. There are multiple ways of enabling the database expansion as may be appreciated by those with ordinary skill in the art. The address decode and control logic is also coupled to optional, cluster address decode and FSA controller, block 802, and decodes addresses for the PRISM memory locations which are used to hold FSA rule block programming information as well as the FSA state information. It may perform the address decode, memory read, memory write and other PRISM memory management control functions by itself or working in conjunction with cluster address decode and FSA controller. The blocks 704 and optionally 802, may be programmed to provide configuration information for the clusters. The configuration information may optionally comprise of size of the NFAs e.g. 8-state or 16-state or the like, CAM functionality enabling, tagged NFA related configuration, context addresses if appropriate for local cluster context addressing and/or global context addresses, clusters specific configurations that may support a mixed CAM and Regular Expression functionality at the PRISM memory level, action memory association for specific FSA rules or clusters or a combination thereof and the like. The PRISM memory cluster arrays and other blocks like global and local priority encoder and evaluation processor, blocks 713 and 815, local (not illustrated) and global action memories, block 717, and the like may get configured and programmed with information before the content inspection begins. Further, since PRISM memory supports dynamic reconfiguration of rules, its programming and configuration may be updated during the content inspection as well for example when a new security threat has been discovered and a new rule to catch that security violation needs to be programmed. The PRISM memory may provide multiple content streams to be processed through the PRISM memory cluster arrays, using context mechanism which associates each content stream with a specific context, which may optionally be assigned a specific context ID.

FIG. 8a illustrates PRISM Memory cluster block diagram. There may be options to have multiple content streams and hence multiple contexts may optionally be simultaneously operated upon in different memory FSA clusters, illustrated in FIG. 8a. For clarity, PRISM Memory cluster, memory FSA cluster, a cluster, memory cluster and memory FSA cluster are used interchangeably in this patent. A given cluster and its associated FSAs may also be able to support multiple content streams using the context information. When a new content stream starts getting processed by a FSA rule block or a cluster or the like, it may traverse through various FSAs whose states may need to be saved, if the content stream is not fully processed, when the same FSAs need to start processing another content stream. The local context memory, block 812, or global context memory, block 712, or external memory (not illustrated) coupled to external memory controller, block 1221, or a combination thereof may be used to save the state of active FSAs for a given context before the FSAs are switched to operate on a different context. Further, the new context may have its saved context restored in the specific FSAs before content from that context starts to be processed. The local context memory along with global context memory affords the benefit of very fast context switching for active contexts simultaneously across multiple clusters and FSAs without creating a context switch bottleneck. The number of contexts being store locally per cluster and those stored globally or externally is a function of the manufacturing cost and other tradeoffs which will be apparent to the one with ordinary skill in the art. Typically the amount of information that needs to be stored and retrieved per context may be limited to the NFAs or FSAs that are in the process of recognizing a specific string defined by its regular expression. In general most NFAs or FSAs may be continuously be starting to analyze the input streams from a start state if the strings being searched are not very frequent in the content being search. The FSA controller, block 802, coupled with blocks 704, and the local and global context memories and their respective memory controllers as well as the blocks 713 and 815, the local priority encoder and evaluation processor, takes the steps to perform the context switch if contexts are enabled before processing a new context. The cluster address decode and FSA controller, block 802, may decode incoming addresses for configuring, reading or writing from PRISM memory locations or the like of the cluster PRISM array, block 808 which is comprised of an array of PRISM FSA rule blocks illustrated above in FIG. 6A and FIG. 6B, and also referred to as PRISM Search Engines (PSE), block 803, in this patent, and activates memory location's word line and/or bit lines or other word lines or content lines or mask lines or the like or a combination thereof, described below to read, write and/or access the specific PRISM memory location. There may optionally be cluster specific bit line drivers and sense amplifiers, block 809, and bit line control logic, block 810, which may be used to read or write specific bits in the PRISM cluster array, block 808. These circuits are well understood by memory designers with ordinary skill in the art. The sense amplifiers and drivers may optionally be present at the global PRISM memory level illustrated in FIG. 7 depending on the tradeoffs of die area, performance, cost, power and the like which one with ordinary skill in the art can easily appreciate. The benefit of having local sense amps and drivers is potentially creating lower interconnect load for individual memory bits, which in turn can help improve the performance. Typically the block 802 may be operating during the configuration, context switching or other maintenance operations like storing and retrieving specific NFA or FSA state information, or refreshing specific PRISM FSA memory bits if appropriate and the like. Generally during content processing the block 802 may be dormant unless there is a match or an error or the like when it may start performing the necessary tasks like communicating the match, action, policy, error or the like to the PRISM controller, initiating context switching and the like. The PRISM controller, block 703, coupled with the content stream logic, block 708, content staging buffer, 709, address decode and control logic, block 704, and the cluster FSA controllers, block 802, may present the content to be examined to the PRISM FSA rule blocks. The content to be examined may be streamed by the block 708 from the data buffer or memory, 707, or from external memory, or a combination into the content staging buffer. The content staging buffer, 709, is coupled to cluster search buffer, 806, and cluster search control, 807 to align the appropriate content to the clusters for searching. The content staging buffer may hold content from the same context or multiple contexts depending on the configuration of the clusters and the like. The content is presented to the cluster PRISM array, 808, that comprises of the PRISM NFA rule blocks for examination in a sequence timed using a control signal like a clock or enable or a combination. The NFA rule blocks perform their inspection and indicate whether there is any rule match or optionally if there is any CAM pattern match or optionally any tag match and the like. The match signals are looked at by cluster level local priority encoder and evaluation processor, block 815, which may determine if there is a match and if there are multiple matches which match should be used, or all matches should be used or the like depending on the configuration. This block 815, may be coupled to global priority encoder and evaluation processor, block 713, which may perform a similar operation by examining match signals from multiple clusters. The local and global evaluation processors of these blocks may optionally generate address(es) for the winning match(es) to the global action memory or external memory or a combination that may store appropriate action information that needs to be retrieved and processed to determine acton(s) that need to be taken as a result of specific rule match(es). There may be optional cluster level action memory, not illustrated, for fast retrieval of action information. This cluster level action memory may act as a cache of the global and/or external memory based action storage. As described earlier the FSA controller, block 802, coupled with local context memory, block 812, its memory controller, block 813, along with the local and global evaluation processor and priority encoders coupled to global action and context memories, may be used to store and retrieve context information from and to configure the PRISM cluster arrays with appropriate FSA states.

FIG. 8b illustrates PRISM Memory cluster detailed block diagram. This figure illustrates more detail of the PRISM memory cluster block diagram illustrated in FIG. 8a and described above. The PRISM memory clusters comprise of PRISM Search Engines (PSE), blocks 803, which comprise of the right-biased or left-biased NFA or FSA rule blocks or a combination which may optionally be tagged as illustrated in FIG. 6A and FIG. 6B and described above. The PSEs may optionally comprise row-wise, column-wise or a combination there of or the like mechanisms to enable PRISM FSA extension and optionally allow creation of PRISM based FSA rule groups. The FIG. 8b illustrates the PSEs arranged in an array with 'n' rows and 'm' columns where 'n' and 'm' may be any integer value and may depend on design, cost, process technology, performance, power and other parameters that one with ordinary skill in the art will appreciate. One exemplary embodiment may comprise of 'n=128' and 'm=8' providing 1024 PSEs per PRISM memory cluster. The PSEs may optionally comprise of mechanisms for extending the FSAs. The PSEs may comprise row-wise FSA extension, column-wise FSA extension or a combination thereof. The PSEs are coupled to each other and may optionally be coupled to the local priority encoder and evaluation processor, block 815, for row-wise FSA extension using one or more signals, illustrated by lines 821(1) through 821(*n*). The PSEs may also be coupled to each other in a column-wise manner using one or more signals represented as a group of lines, 820 (21) through 820(*nm*), coupling PSEs to their column-wise neighbors. Such signals may be used to provide a column-wise FSA extension. The PRISM cluster priority encoder and evaluation processor, block 815, may further comprise configurable controls that would allow any group of extensible FSAs to be coupled to other groups of FSAs local to the PRISM memory duster or inter-clusters (i.e. between multiple PRISM memory clusters) or a combination thereof. Cluster Address Decode and FSA Controller, block 802, provides controls, 804(1) through 804(*n*) like word line address and the like for each PSE and its internal memory elements like the SDV, Symbols and the like which are used to configure the PSEs with appropriate RE rules converted or compiled in to programmable FSA data structures. It may also be coupled to the cluster search controller, block 807, and sense amps and read buffers, block 819. The cluster search controller, block 807, may receive the byte values to be configured into the PSEs and may comprise the bit line drivers for the PSE memories. The sense amps and read buffers may comprise the sense amplifiers and data read buffers to read and store the information retrieved from the PSE array. Once the PRISM memory dusters are configured with the RE rules, the content to be processed may be presented to the cluster search controller. The cluster search controller, block 807, is coupled to the columns of PSEs using signals, 822(1) through 822(*m*), that may comprise bit lines for each of the 'm' columns of the PSE array. The cluster search controller may present the same content symbols or characters or bytes or the like, to each column of the array such that every FSA can process each incoming symbol and be evaluated simultaneously. However, if the PRISM cluster is configured to be used as content addressable memory, the content search controller may present the content in chunks of 'm' symbols or chunks of two 'm/2' symbols or the like to the PSE array. The PSEs provide the indication of whether a match with the programmed rules is detected or not or if a tag is matched or not or the like in a row-wise manner to the local priority encoder and the evaluation processor, block 815, using the signals, 811(1) through 811(n), that couple the PSEs in a row with the block 815. The local priority encoder and evaluation processor may receive the match signals and based on optional policy programmed, provide the winning match if multiple match signals are asserted simultaneously or may record each match or a combination. It may also provide counters to keep track of the specific location in the incoming content stream where a match or a set of matches were generated. It may further provide actions associated with specific RE or FSA rules being activated and may comprise of stopping the processing of the specific content flow or content stream or content session or the like; or generating an alert or activating a new rule group or stopping a certain rule group from further examination or a combination there of or the like. It also communicates with the global priority encoder and evaluation processor, 713, to take appropriate actions similar to those described above. The content read into the read buffers of block 819, may be coupled to the local cluster context memory, 812, or global context memory, 712, or external memory controller, 721, through the signals 817, block 815, signal 814, signals 711 and signals 715 for storage to the appropriate memory location internal to the PRISM chip or an external memory coupled to the block 721 using the external interface signals 720.

Each PSE of a PRISM memory cluster may be addressed using one PRISM Memory location or a set of PRISM memory locations or a combination thereof. All internal memory elements of a PSE like the each state dependent symbol memory, mask vector memory, SDV memory, or the initialization vector memory and the like may each be mapped as individual memory locations in the PRISM memory address space or may each be addressable in a PSE address space once the PSE is selected from a PRISM memory address or the like as may be appreciated by one with ordinary skill in the art. One preferred embodiment may comprise of 22 PRISM Memory address bits where in the upper 17 address bits are used to select a specific PSE in an embodiment with 128,000 PSEs and the lower 5 address bits are used to select a specific memory element of the selected PSE as described above. Other variations of such an arrangement are within the scope and spirit of this invention as may be appreciated by one with ordinary skill in the art. The number of address bits allocated to select PSEs depends on the number of PSEs and the number of address bits allocated to select memory elements of a PSE depend on the number of memory elements in one PSE, which may in turn depend on the number of states per PSE, FSA extension mechanisms per PSE, symbol size and the like as may be appreciated by one with ordinary skill in the art. Further, a specific PSE within a duster may be addressed or selected by PRISM memory cluster row address and a column address which would be derived from the PSE address bits. One preferred embodiment of PRISM memory with 128,000 PSEs may use 128 rows and 8 columns of PSEs per PRISM memory cluster, there by supporting 1024 PSEs per PRISM memory cluster. In such a PRISM memory embodiment, upper 7-bits of the 22-bits for PSE address may be allocated to select a specific PRISM memory cluster, and the next 10 bits of the PSE address may optionally be used to select a specific PSE in a PRISM memory cluster while the lower 5 bits may optionally be used to select a specific memory element of the selected PSE of the selected PRISM memory cluster. The 10-bit address for selecting a specific PSE of a PRISM memory cluster, may further be allocated such that upper 7-bits of that may be used as a PSE row address selection and the remaining 3-bits of the address used as a PSE column address selection. There are multiple other ways to perform the addressing of PRISM memory as may be appreciated by one with ordinary skill in the art and all such variations are within the spirit and scope of the teachings of this invention.

FIG. 9 illustrates a PRISM search compiler flow (full and incremental rule distribution). The flow can be used for distributing search rules or security rules when the full set of rules are defined or when any updates or modifications are made to the rule set and incremental changes to the rule set need to be communicated and configured in the PRISM search memory. The search memory may be used in distributed security architecture within system nodes across a network which may be a LAN, WAN, MAN, SAN, wireless or wired LAN and the like. The rules like application layer rules, network layer rules or storage network layer rules or any other content search rules may be created using manual or automated means and provided as inputs to the search compiler flow in a predefined format. The rules may be created per each layer of a seven layer OSI networking stack or there may be other non OSI layer specific rules like application layer rules or network layer rules or storage area networking rules or the like. The network layer rules may comprise of access control rules, network address based rules, port specific rules, protocol specific rules and the like. The storage area networking rules may comprise logical unit number (LUN) masking rules, frame filtering rules, zoning rules and the like. The search compiler's rule parser, 904, parses the rules and converts them into regular expression format if the rules are not already in that form. Then the regular expression rules are converted into FSA rules compiled to the node capabilities of the node that has the PRISM content search memory and stored in the rules database. The rules from the rule database are retrieved and distributed by the rules distribution engine to the appropriate node(s) with the PRISM search memory. The search or security rules may be distributed to the host processor or a control processor or a host microprocessor or a network processor or a master processor or a combination thereof as appropriate depending on the node capability. The rules may be distributed using a secure link or insecure link using proprietary or standard protocols as appropriate per the specific node's capability over a network. The network may be a local area network (LAN), wide area network (WAN), internet, metro area network (MAN), wireless LAN, storage area network (SAN) or a system area network or another network type deployed or a combination thereof. The network may be Ethernet based, internet protocol based or SONET based or other protocol based or a combination thereof.

FIG. 10 illustrates PRISM FSA Compiler flow. The regular expressions for the content search are presented to the PRISM FSA Compiler flow by the rules parser, block 904. PRISM compiler flow may optionally be implemented as a stand alone compiler as well and may read regular expressions for the content search rules or security rules or the like generated by an IT manager or a user or a tool or a combination or the like for compilation to PRISM. PRISM FSA compiler reads the regular expressions, block 1002, from a storage device like a disk drive or a file server or memory or the like or directly from the output of another tool or a combination and processes these regular expressions optionally in the order specified. Since PRISM processes RE rules using independent FSAs or NFAs, the REs are compiled individually, however it may be possible for the PRISM FSA compiler to process more REs for one FSA for PRISM that supports multiple REs per FSA block. The PRISM compiler flow comprises of one or more of the steps illustrated in the FIG. 10 and described below which may be performed in the illustrated order or another order to compile the rules for PRISM as may be appreciated by one with ordinary skill in the art. PRISM compiler flow checks if all the regular expressions have been processed or not, block 1003, and if any expressions are left, it goes through the path, 1004, otherwise it follows the path, 1017. When a regular expression is read by the block, 1005, it is parsed, block 1006, to understand various constructs of the regular expression. The PRISM compiler flow may at this stage indicate an error if there are any issues with the regular expression like any syntax being invalid or the like. The error flow is not illustrated in the figure but may optionally comprise of logging the regular expression with an error, informing the user or the application or the like of the error, ignore the error and move on to the next regular expression, or stop the processing altogether or the like or a combination of the foregoing. However, if no errors are discovered, the regular expression's syntax tree is constructed, block 1007, and various symbols of the regular expression are extracted, block 1008. The regular expression symbols are then marked, block 1009, to make each symbol unique as per the requirement of the Berry-Sethi's FSA construction algorithm. For example a regular expression like (a|b)*cd(a|ef* may be marked as $(a_0|b_1)*c_2d_3(a_4|e_5f_6)*$ there by making each symbol of the regular expression unique. This regular expression is now linear and is processed, block 1010, to find the determinants that extract whether empty string is part of the language of the regular expression and its components. The compiler flow may extract the first states that are entered from the start state of the regular expression, block 1011. For the above example the first states are: $a_0$, $b_1$, and $c_2$ which may all be entered on processing the first symbol from the start state. Then the PRISM FSA compiler flow may extract the follow states, block 1012 for each of the states or symbols of the FSA. For the example above the following may be the follow states per each state:

State $a_0$: Follow states: $a_0$, $b_1$, and $c_2$
State $b_1$: Follow states: $a_4$, $b_1$, and $c_2$
State $c_2$ Follow states: $d_3$
State $d_3$: Follow states: $a_4$, or $e_5$
State $a_4$: Follow states: $a_4$, or $e_5$
State $e_5$: Follow states: $f_6$
State $f_6$ Follow states: $a_4$, or $e_5$ The PRISM compiler flow then creates the state transition list per state, 1013, from the follow states above which essentially form the state transition list from each state. The PRISM compiler flow then extracts terminal or accept states, 1014 of the regular expression. For the example expression above the accept states are: $d_3$, $a_4$, and $f_6$, Once all the processing of the FSA states is done, the marked symbols are converted back to their unmarked form and the appropriate PRISM programmable FSA data structures generated, block 1015 for example, SDV per FSA state, state symbols, symbol mask if any, initial or first states, accept states as well as optional tag states if the regular expression is tagged, a left biased or right-biased control if PRISM implements such option, any associated action to be taken, the FSA ID that will hold this RE and the like. This RE in the PRISM compiled form may either be kept in memory or storage or the like and once all such REs are processed they may all be stored in a compiled rules database, block 1018. Each compiled RE may be deposited individually in the database or all rules may be deposited once they are all processed or a combination. The compiled rules database may be an actual database or a file or a storage element or the like that records the compiled rules data that may then be programmed into an appropriate PRISM device by the rules distribution engine, 909, working with the PRISM controller of the corresponding PRISM device.

The PRISM memory of this invention may be manufactured into hardware products in the chosen embodiment of various possible embodiments using a manufacturing process, without limitation, broadly outlined below. The PRISM memory in its chosen embodiment may be designed and verified at various levels of chip design abstractions like RTL level, circuit/schematic/gate level, layout level etc. for functionality, timing and other design and manufacturability constraints for specific target manufacturing process technology. The design would be verified at various design abstraction levels before manufacturing and may be verified in a manufactured form before being shipped. The PRISM memory design with other supporting circuitry of the chosen embodiment at the appropriate physical/layout level may be used to create mask sets to be used for manufacturing the chip in the target process technology. The mask sets are then used to build the PRISM memory based chip through the steps used for the selected process technology. The PRISM memory based chip then may go through testing/packaging process as appropriate to assure the quality of the manufactured product.

Thus the inventions of this patent cover various aspects like:

A memory architecture comprising programmable intelligent search memory (PRISM) for content search wherein the PRISM memory provides search capability for regular expression based search and regular expressions are compiled into a format recognized by PRISM and that follows the PRISM FSA algorithm.

The regular expression compiler comprises of one or more of the following steps in no specific order:

1. Read mechanism to read regular expressions and a read process to do the same
2. Parse mechanism to parse RE and a parse process to do the same
3. Syntax tree generation mechanism to generate syntax tree and a syntax tree generation process to do the same
4. RE error handling mechanism to handle RE errors and a process to handle RE errors
5. RE symbol extraction mechanism to extract RE symbols and an RE symbol extraction process to do the same
6. RE marking mechanism to mark RE symbols with unique integers and a RE marking process to do the same
7. A FSA linearization mechanism to create a linear FSA and create its determinants to extract presence or absence of empty string in the language defined by the RE and a process to do FSA linearization
8. A mechanism to find and extract first states of the linear FSA and a process for first state identification and extraction
9. A mechanism to find and extract follow states of the linearized FSA and a process for follow state identification and extraction
10. A mechanism to find and extract the state transition list per state and a process for state transition list identification and extraction
11. A mechanism to find and extract the accept or terminal states and a process for accept or terminal states identification and extraction
12. Create PRISM programmable FSA data structure for the RE comprises one or more of SDV, state symbols, LB/RB, Accept state, Initial States or Initial vector, tag states, FSA ID or a combination of the foregoing 13. A mechanism to generate the Compiled RE expressions rules data base comprising the PRISM programmable FSA data structures and a method for the compiled RE rules data base generation.
14. A mechanism to provide the compiled rules data base to a rules distribution engine or other agent to program these rules in the target PRISM device and a method to do the same
15. A mechanism to generate a programmable FSA rule ID for programming the linear FSA in one specific memory location of PRISM memory locations that are randomly accessible to access, store or program the programmable FSA rule memory circuits
16. A mechanism to generate specific actions that need to be taken when a particular regular expression programmed in the PRISM FSA rule blocks is matched or
17. a combination of the foregoing.

The PRISM memory further comprises an array of search memory circuits that provide the regular expression search functions for searching content from documents, messages or packets or other data received from the network or the local host or a master processor or a network processor or TCP Offload Engine or Processor or Storage Network processor or a security processor or other processor or a combination thereof.

The PRISM memory further comprises of a plurality of clusters of the search memory circuits that provide regular expression search functions for a plurality of regular expressions. The search memory circuits comprise of memory elements to store symbols of finite state automata representing the regular expressions. The search memory circuits further comprise memory elements to store mask vectors (MV) that may be applied to the stored symbols. The mask vectors are coupled to the symbol memory elements and the content being searched through symbol evaluation circuits that detect whether the received content comprises of the symbols being searched. The search memory circuits further comprise of memory elements to store elements of state dependent vectors (SDV) which are used to decide the state traversal by the search memory for the finite state automata. The search memory circuits further comprise of match detect circuits that operate by coupling with the memory elements for symbols, MVs, SDVs, and the symbol evaluation circuits for multiple states of the FSAs to decide on the traversal of the states in the FSA based on the content being searched and the programmed symbols, SDVs, and MVs. The search memory circuits may further comprise tag and match detect circuits that operate to provide tagged FSA and regular expression search, wherein the tagged FSA is used to detect sub-string or partial regular expression match beside a full regular expression match.

The memory elements of the PRISM memory comprise of static memory cells. The memory elements are each independently addressable in a random order. The PRISM memory further comprises of circuits to couple the content search memory with other logic to provide coupling with processors that can interface to the PRISM memory integrated circuits. The PRISM memory further comprises of a controller for interfacing with the processors to receive the content to be searched. The PRISM memory may further comprise of address decode logic circuits which decode the received address to select the specific static memory cells location to be read or written. The memory elements of the search memory may each be uniquely addressed to read or write appropriate values in the memory elements. The address decoding logic and the controller generate control signals necessary to address the appropriate memory locations of the static memory cells based search memory. The control signals are coupled to the PRISM arrays as a series of word lines and bit lines that can randomly be used to access desired memory locations.

The memory elements of PRISM support detection of character pattern strings. The PRISM memory comprises of symbol detection circuits and may optionally comprise of mask vectors per symbol bits, that may be used to evaluate received character string using simple XOR based compare or other logic function and create a match indication. The PRISM match signal processing circuits may logically combine multiple match signals from each symbol detection block to generate a composite match signal which would be activated only if all the symbols have a match. The composite match signal creates a match functionality like a traditional CAM chip and thus enable PRISM chip to be partially or fully configured to behave like a CAM provide a pattern matching functionality beside regular expression search.

While the foregoing has been with reference to particular embodiments of the invention, it will be appreciated by those with ordinary skill in the art that changes in these embodiments may be made without departing from the principles and spirit of the invention.

The invention claimed is:

1. A compiler for compilation of a content search rule, the content search rule comprising a regular expression, the regular expression comprising a symbol, the compiler generating a data structure derived from the regular expression, the data structure comprising a finite state automata representing functionality of the regular expression, the finite state automata(FSA) comprising a compiled representation of the symbol; a state corresponding to the symbol; a state dependent vector to control transition to or from the state; an initial vector for an initial state of the FSA and an accept state vector for an accept state of the FSA, the data structure for programming a programmable intelligent search memory (PRISM) comprising a programmable FSA memory circuit comprising a symbol memory circuit for storing the symbols; a state memory circuit to store the state; a state dependent vector memory circuit for storing the state dependent vector; an initial vector memory circuit for storing the initial vector; and an accept state vector memory circuit for storing the accept state vector, the PRISM further comprising an array of randomly addressable locations to program the programmable finite state automata memory circuits using the data structure.

2. The compiler of claim 1, further comprising:
    a) a read mechanism to read the regular expression;
    b) a parse mechanism to parse the regular expression;
    c) a syntax tree generation mechanism to generate syntax tree of the regular expression;
    d) an error handling mechanism to handle errors in the regular expression;
    e) a symbol extraction mechanism to extract the symbol of the regular expression;
    f) a marking mechanism to mark the symbols of the regular expression;
    g) a FSA linearization mechanism to create a linear FSA from the FSA;
    h) a mechanism to find and extract first states of the linear FSA;
    i) a mechanism to find and extract follow states of the linear FSA;
    j) a mechanism to find and extract state transition list of the linear FSA;
    k) a mechanism to find and extract accept states of the linear FSA;

l) a mechanism to create a PRISM programmable FSA data structure for the regular expression;

m) a mechanism to generate a compiled regular expression rules data base comprising the FSA data structure of the regular expression;

n) a mechanism to store or distribute the compiled regular expression rules data base;

o) a mechanism to generate a programmable FSA rule ID for programming the linear FSA in one specific memory location of the PRISM locations; or p) a mechanism to generate specific actions associated with the regular expression rules when a particular regular expression of the regular expression rules programmed in the PRISM FSA memory circuits is matched; or q) any combination thereof.

3. The FSA linearization mechanism of claim 2, further comprising marking the symbol of the FSA with a unique integer.

4. The FSA linearization mechanism of claim 2, further comprising a mechanism to create determinants of the linear FSA to detect presence or absence of an empty string in a language defined by the regular expression.

5. The compiled regular expression rules data base of claim 2, comprising
  a) Application layer rules to detect content from an application layer of an OSI stack;
  b) Network layer rules to detect content from a network layer of an OSI stack; or
  c) Storage area networking rules to detect content in a storage area network: or
  d) Any combination thereof.

6. The compiled regular expression rules data base of claim 5, further comprising
  a) Anti-spam rules for detecting spam messages in the content;
  b) Anti-virus rules for detecting viruses in the content;
  c) Anti-spyware rules for detecting spyware in the content;
  d) Digital rights management rules for detecting digital rights compliance or violation in the content;
  e) Anti-phishing rules for detecting information indicating phishing attempts in the content;
  f) Intrusion detection rules for detecting information indicating intrusions from the content;
  g) Extrusion detection rules for detecting information indicating extrusions from the content;
  h) Legal compliance detection rules for detecting information that may violate legal compliance rules from the content;
  i) Worm detection rules for detecting computer worms from the content;
  j) Instant message inspection rules for detecting malware in the content which is an instant messaging content;
  k) XML security rules for detecting security compliance or violation of the content which is a XML content; or
  l) VOIP rules for detecting VOIP security violation from the content; or
  m) any combination thereof.

7. The storage area networking rules of claim 5, comprising:
  a) Logical unit number (LUN) masking rules for regulating storage area network traffic to allow or deny access to specific LUNs;
  b) Zoning rules for enforcing zones in a storage area network;
  c) Frame filtering rules to filter frames in a storage area network; or
  d) Logical block addressing rules for controlling access to specific logical block addresses in a storage area network; or
  e) Any combination thereof.

8. The network layer rules of claim 5, comprising:
  a) Access control rules for controlling access to a network;
  b) Network address rules for controlling access to or from specific network addresses of a network;
  c) Port specific rules for controlling access to specific network ports of a network; or
  d) Protocol specific rules for checking protocol Violations of a network protocol operating on a network; or
  e) Any combination thereof.

9. The compiler of claim 1, further comprising a FSA extension mechanism to compile a regular expression that results in finite state automata with a number of symbols more than symbol memory circuits of the programmable FSA memory circuit to store the symbols.

10. The compiler of claim 9, further comprising:
  A) A group forward input vector generation mechanism to generate the group forward input vector;
  B) A group forward output vector generation mechanism to generate the group forward output vector;
  C) A global forwarding vector generation mechanism to generate the global forwarding vector;
  D) A local forwarding vector generation mechanism to generate the local forwarding vector;
  E) An up or down control vector generation mechanism to generate the up or down control vector;
  F) A global state dependent vector generation mechanism to generate the global state dependent vector; and
  G) A global control vector generation mechanism to generate the global control vector.

* * * * *